United States Patent
Schwetman, Jr. et al.

(10) Patent No.: US 9,535,842 B2
(45) Date of Patent: Jan. 3, 2017

(54) SYSTEM AND METHOD FOR PERFORMING MESSAGE DRIVEN PREFETCHING AT THE NETWORK INTERFACE

(71) Applicant: Oracle International Corporation, Redwood City, CA (US)

(72) Inventors: Herbert D. Schwetman, Jr., Austin, TX (US); Mohammad Arslan Zulfiqar, Madison, WI (US); Pranay Koka, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 232 days.

(21) Appl. No.: 14/472,105

(22) Filed: Aug. 28, 2014

(65) Prior Publication Data

US 2016/0062894 A1 Mar. 3, 2016

(51) Int. Cl.
*G06F 12/08* (2016.01)
*G06F 13/16* (2006.01)
(Continued)

(52) U.S. Cl.
CPC ....... *G06F 12/0862* (2013.01); *G06F 12/0813* (2013.01); *G06F 12/0842* (2013.01);
(Continued)

(58) Field of Classification Search
CPC .............. G06F 12/0862; G06F 12/0284; G06F 12/0806; G06F 12/0813; G06F 12/084; G06F 12/0842; G06F 13/1657; G06F 13/1633; G06F 2212/602; G06F 2212/603; G06F 2212/6028; G06F 2212/154; G06F 2212/254; G06F 2212/263;G06F 2212/284; G06F 3/0611; G06F 3/061; G06F 3/067; G06F 3/0649
See application file for complete search history.

(56) References Cited

U.S. PATENT DOCUMENTS 5,606,665 A 2/1997 Yang et al.
7,327,674 B2 2/2008 Eberle et al.
(Continued)

OTHER PUBLICATIONS

"The Network Architecture of the Connection Machine CM-5", Charles E. Leiserson, et al., Feb. 7, 1996, pp. 1-16.
(Continued)

*Primary Examiner* — Michael Krofcheck
(74) *Attorney, Agent, or Firm* — Robert C. Kowert; Meyertons, Hood, Kivlin, Kowert & Goetzel, P.C.

(57) ABSTRACT

Each computing node of a distributed computing system may implement a hardware mechanism at the network interface for message driven prefetching of application data. For example, a parallel data-intensive application that employs function shipping may distribute respective portions of a large data set to main memory on multiple computing nodes. The application may send messages to one of the computing nodes referencing data that is stored locally on the node. For each received message, the network interface on the recipient node may extract the reference, initiate the prefetching of referenced data into a local cache (e.g., an LLC), and then store the message for subsequent interpretation and processing by a local processor core. When the processor core retrieves a stored message for processing, the referenced data may already be in the LLC, avoiding a CPU stall while retrieving it from memory. The hardware mechanism may be configured via software.

20 Claims, 12 Drawing Sheets

(51) Int. Cl.
*H04L 29/06* (2006.01)
*G06F 12/10* (2016.01)

(52) U.S. Cl.
CPC ...... *G06F 13/1657* (2013.01); *G06F 13/1663* (2013.01); *H04L 69/22* (2013.01); *G06F 12/1027* (2013.01); *G06F 2212/1024* (2013.01); *G06F 2212/602* (2013.01); *G06F 2212/603* (2013.01)

(56) References Cited

U.S. PATENT DOCUMENTS

| | | | |
|---|---|---|---|
| 7,631,106 B2 | 12/2009 | Goldenberg et al. | |
| 2003/0009643 A1* | 1/2003 | Arimilli | G06F 12/0813 711/155 |
| 2003/0088636 A1* | 5/2003 | Nakamura | G06F 9/383 709/213 |
| 2010/0281221 A1* | 11/2010 | Cantin | G06F 12/0813 711/132 |
| 2011/0173396 A1* | 7/2011 | Sugumar | G06F 12/1081 711/137 |
| 2013/0097402 A1* | 4/2013 | Bao | G06F 12/0862 711/205 |

OTHER PUBLICATIONS

"Data Cache Prefetching Using a Global History Buffer", Kyle J. Nesbit and James E. Smith, Feb. 2004, pp. 1-10.

"Improving Direct-Mapped Cache Performance by the Addition of a Small Fully-Associative Cache and Prefetch Buffers", Norman P. Jouppi, 1990, pp. 388-397.

"An Effective On-Chip Preloading Scheme to Reduce Data Access Penalty", Jean-Loup Baer, Tien-Fu Chen, 1991, pp. 176-186.

"Data Prefetch Mechanisms", Steven P. Vanderwiel and David J. Lilja, Jun. 2000, pp. 174-199.

"The Common System Interface: Intel's Future Interconnect", David Kanter, Aug. 28, 2007, 1 page.

"Exploring Data Prefetching Mechanisms for Last Level Cahce in Chip Multi-Processors", accessed Dec. 5, 2013, pp. 1-3.

"Sequential Hardware Prefetching in Shared-Memory Multiprocessors", Dahlgreen, F., et al., Jul. 1995, pp. 1-2.

"Neighborhood Prefetching on Multiprocessors Using Instruction History", David M. Koppelman, Oct. 2000, pp. 1-10.

"PACMan: Prefetch-aware Cache Management for High Performance Caching", ACM Digital Library, Carole-Jean Wu, et al., 2011, pp. 1-2.

* cited by examiner

SYSTEM AND METHOD FOR PERFORMING MESSAGE DRIVEN PREFETCHING AT THE NETWORK INTERFACE

BACKGROUND

1. Field of the Disclosure

This disclosure relates generally to parallel processing, and more particularly to systems and methods for performing message driven prefetching at the network interface for distributed applications that employ a function shipping model.

2. Description of the Related Art

Existing computer systems implement prefetching in several different ways and for a variety of purposes. For example, one commonly used method for prefetching (which is sometime referred to as "software prefetching") is to include a "prefetch" instruction in the processor instruction-set-architecture (ISA). In systems that employ software prefetching, these prefetch instructions can be placed in the application code to bring data into the cache hierarchy from memory before the processor requires it. These prefetch instructions can be inserted into the application code either explicitly by the programmer or automatically by the compiler. In cases in which the data access pattern is not known beforehand, prediction algorithms can be employed by the application and/or the compiler to issue prefetches on a somewhat speculative basis.

Another existing approach for prefetching, which is sometimes referred to as "hardware prefetching" does not require the explicit use of prefetch instructions to perform prefetching. Instead, systems that employ hardware prefetching typically rely on special hardware predictors that monitor memory requests issued by the processor to infer future accesses. These systems typically employ learning algorithms to predict future memory accesses based on the recent history of accesses.

Some existing network interfaces support fast user-level messaging mechanisms (e.g., for communication between the processes or threads of parallel programs). In a large cluster environment, such mechanisms remove operating system and message copy overhead, and can lead to improvements in latency and network bandwidth usage, especially in the case of small messages. In applications that employ a function shipping model of parallel processing, the inter-process/thread messages are typically requests that contain a reference (or pointer) to one or more data items, along with other processing specifications. In other words, applications that employ function shipping often access local data structures based on the content of a received message. In such cases, upon receiving a message, the user application accesses local data that is directly or indirectly referenced by the contents of the message. In the case that these applications include large problems (e.g., computations that operate on extremely large data sets, which are sometimes referred to as "big-data computations" or "data-intensive applications"), and due to the random access patterns they typically experience, these accesses almost always miss in the cache hierarchy, causing processors stalls. In such cases, the benefits of fast messaging with zero-copy optimizations are typically not fully realized, as the bottleneck is shifted to the local data accesses that are triggered by the receipt of the messages.

SUMMARY

In various embodiments, the distributed computing systems described herein may implement a message driven prefetching mechanism at the network interfaces of the computing nodes that participate in executing parallel applications. For example, each computing node of the distributed computing system may implement a hardware mechanism at the network interface that initiates the prefetching of application data in response to the receipt of an incoming message destined for one of the application processes executing on that computing node. The use of the message driven prefetching mechanism may improve the performance of parallel data-intensive applications that employs function shipping by reducing the CPU stall time typically experienced in such applications. In some embodiments, the message driven prefetching mechanism may be enabled or disabled for a particular application or message thereof (e.g., based on the value of a prefetch control bit in the message).

In some embodiments, a parallel data-intensive application that employs function shipping may distribute respective portions of a large data set to the main memory on each of multiple computing nodes that will participate in the execution of the application. A process of the application executing on one computing node may send a message (e.g., a function shipping message) to another one of the computing nodes referencing data that is stored locally on the other computing node and that is to be processed on the other computing node. In some embodiments, when the network interface (e.g., a network interface card) on the recipient computing node receives the message, the network interface hardware may extract a reference to the local data from the message. For example, the hardware mechanism may include multiple configuration/control registers (which may be configurable via software) containing parameter values that may be used to locate the information within the message that references the local data, and may also be used, along with the information extracted from the message, to compute the physical address and extent of the referenced data. In some embodiments, the computed address and extent of the referenced data may be communicated to a cache prefetcher (e.g., last level cache prefetcher), which may perform the prefetch operation on behalf of the network interface.

In various embodiments, the parameter values programmed in the configuration/control registers may include values that specify one or more of: the position of the reference within the message, the width of the reference within the message, the base address of a data structure in which the referenced data is stored in main memory on the computing node, the number of data items to be prefetched, or the size of a data item to be prefetched. In some embodiments, the network interface may be configured to compute a virtual address for the referenced data, based on the information extracted from the message. In such embodiments, the network interface may provide the virtual address to a translation lookaside buffer, which may compute the physical address of the referenced data.

In some embodiments, after extracting the reference to the local data and computing its address and extent, the network interface may initiate the prefetching of the referenced data into a local cache (e.g., a last level cache, or LLC), and then may store the message for subsequent interpretation and processing by a local processor core on the recipient computing node. For example, if the message is short, it may be stored in a local register that is configured to store messages to be processed by a particular one of multiple processor cores on the recipient computing node, dependent on an identifier of the processor core that is included in the message. However, longer messages may be stored in main memory, e.g., in a local list, buffer (e.g., a receive buffer), queue (such as a FIFO queue), or any other suitable data structure. In some embodiments, when the processor core retrieves a stored message for processing, the referenced data may already be in the LLC. Thus, for at least some of the messages received by the computing node, the long CPU stalls that are typically experienced by applications that employ function shipping (e.g., while retrieving data that was referenced in the messages from main memory) may be avoided. The message driven prefetching techniques described herein may be particularly well-suited for use with graph processing or graph search applications. However, the use of these techniques may also improve memory latency performance in other types of parallel data-intensive applications that employ function shipping or other messaging schemes in which the messages exchanged between computing nodes contain references to local data that are random or otherwise not easily predictable using existing techniques.

Figure 1:
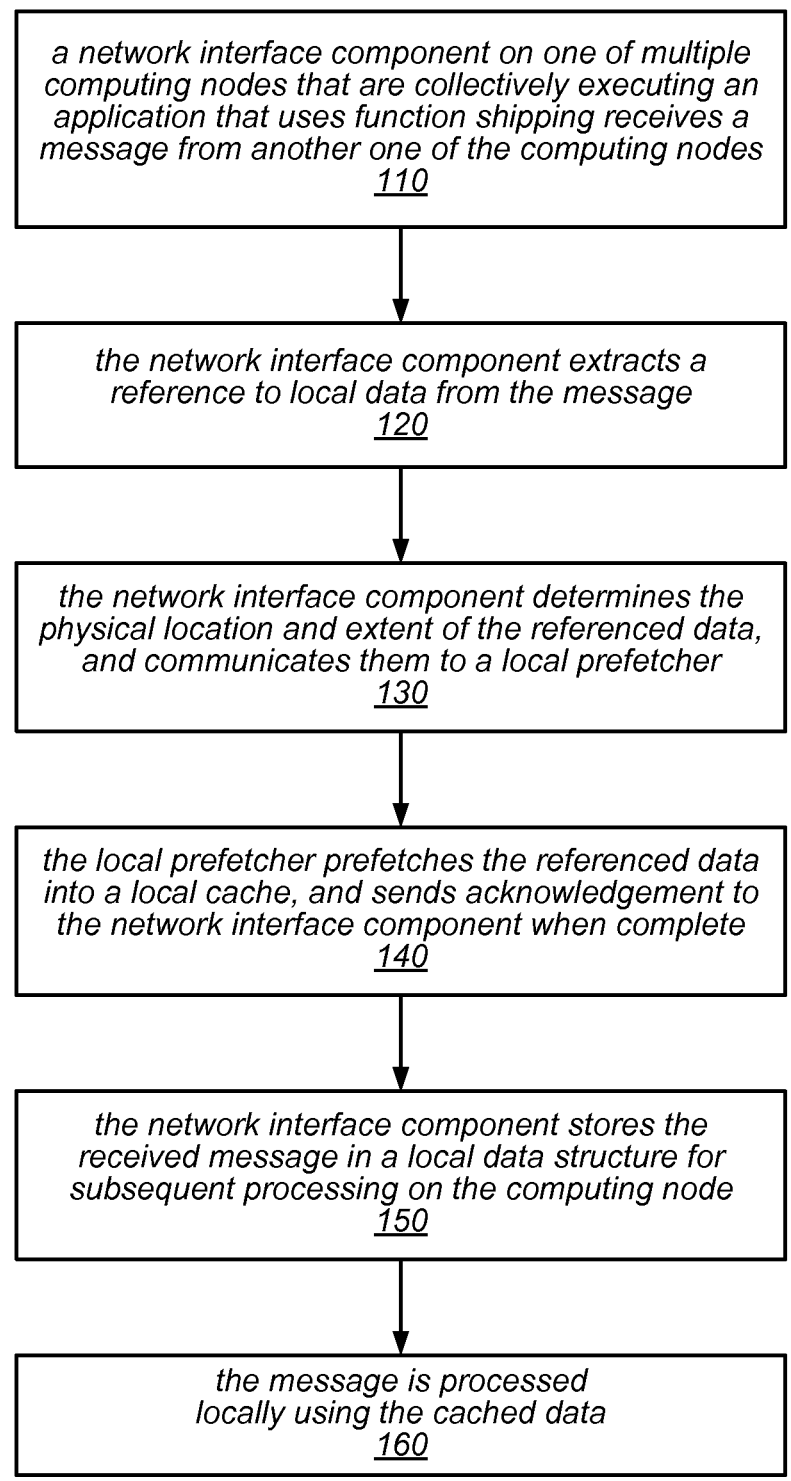
FIG. 1 is a flow diagram illustrating one embodiment of a method for performing message driven prefetching at a network interface, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As described in more detail below, in some embodiments, the systems and methods described herein may be used to improve the performance of data-intensive computations that are executed in distributed computing systems. For example, a distributed computing system may include a large number of computing nodes (perhaps hundreds or thousands of computing nodes) that are connected by a network, and that computer system may be used to solve a very large problem, e.g., a computation that operates on a very large data set. For some applications in this space, processing the computation may include employing a "function shipping" model, in which a software process executing on one of the connected computing nodes sends a message to a software process executing on another one of the connected computing nodes. For example, to execute this type of application, the data set over which the computation operates may be partitioned and distributed across the connected computing nodes, with each of the individual items being held on a single one of the computing nodes.

Under a function shipping model, each computing node may be responsible for processing (or otherwise operating on) portions of the data set that are stored locally on the computing node (e.g., in response to messages sent to the computing node by other computing nodes indicating that the computing node should process a particular portion of the data set that is stored locally). However, when a process or thread of an application that employs function shipping comes across something that needs to be processed by another computing node (e.g., because the portion of the data set that needs to be processed is stored on the other computing node), it may send a message to the other computing node indicating that the other computing node should process that portion of the data set. Many such messages may be exchanged between the computing nodes that are participating in the execution of the data-intensive application. For example, in some cases, there may be hundreds or thousands of computing nodes generating many thousands (e.g., hundreds of thousands) or millions of these function shipping type messages.

In one example, during execution of a parallel data-intensive application, a process A (e.g., one of multiple processes used to execute the computation) that is executing on a given computing node may send a message to a process B (e.g., another one of the multiple processes used to execute the computation) that is executing on a different computing node, and the message may indicate (through a direct or indirect reference) that process B should access a specific location in its local memory and process the information that is stored there. In some embodiments, process B may know how to process the data at the indicated memory location. In other embodiments, the message may also indicate one or more operations to be performed by process B on the data at the indicated memory location. In either case, content may be extracted from the message that relates to data that is local to process B (e.g., data that is stored on the same computing node on which process B is executing).

In other words, for parallel data-intensive applications that employ a function shipping type model, there is a relationship between the message content and local data that a recipient process (the recipient of the message) will need for processing its portion of the application. After process B receives the message, it must find the data that is directly or indirectly referenced by the contents of the message in its local memory and process it. In the case of large problems (big-data computations), due to the large problem sizes and the random access pattern, it is very likely that process B has never operated on (or even attempted to access) the referenced piece of data before. Hence, these accesses may almost always miss in the cache hierarchy, causing CPU stalls while the data has to be fetched from main memory. While fetching data from a cache (e.g., when there is a cache hit) may only take a few cycles, accessing data in main memory may take hundreds or even thousands of cycles.

As noted above, in these types of applications (which may include graph search algorithms or graph processing algorithms in which a graph is represented as a data structure containing nodes and edges that connect the nodes), the benefits of fast messaging with zero-copy optimizations may not be fully realized, as the bottleneck is shifted to local data accesses triggered by the message. For example, for a graph processing or graph search algorithm that analyzes mobile phone usage data (e.g., one in which node in the graph represents a mobile phone and the edges represent calls between pairs mobile phones), the graph to be operated on may include millions of nodes and billions of edges. In this example, the data to be analyzed will not fit in the memory of a single computing node, and is spread out over a collection of memories on many computing nodes. In existing distributed computing systems, when a message received by a particular computing node indicates that the computing node (or a processor core thereof) should operate on data in a referenced portion of the graph, it is unlikely that the referenced data has already been accessed by any of the computing nodes participating in the analysis, including the particular node that received the message, or that any previous access was recent enough that the referenced data can be found in a local cache.

This effect can be exacerbated in the case of small messages. For example, when characterizing a parallel breadth-first-search (BFS) graph kernel executing in an existing distributed computing systems, it was found that messages were typically 16 bytes (16 B) in size and each message triggered a cache miss to a critical data structure. Each application thread/process of this graph search application received millions of these messages causing a significant overhead. In fact, experiments have shown that for parallel data-intensive applications that employ function shipping and are executing in existing distributed computing systems, more time may be spent waiting for accesses to main memory than anything else (including performing the desired computation on the accessed data). In some cases, this may be because the data references (i.e., the distribution of data references or local data accesses) may be largely (or completely) random. Therefore, there may not be a way to anticipate or predict the data references that will be included in message such that an explicit software prefetch or a predictive hardware prefetch can load the data referenced by a message into the cache before the message is presented to a processor core on a recipient computing node for processing and the processor core interprets the message.

In some embodiments, the systems and methods described herein may mask and/or mitigate the long memory access times that are typically experienced when executing parallel data-intensive applications that employ function shipping. For example, these systems may implement a message driven prefetching mechanism that serves to prefetch the data that is directly or indirectly referenced in a function shipping type message into a local cache in response to the message being received at the network interface of the recipient computing node (e.g., prior to the message being made available to a processor core of the computing node for interpretation and/or processing). More specifically, in some embodiments, the distributed computing systems described herein may implement a hardware mechanism for prefetching application data on receipt of messages at the network interface (NI) of the recipient computing node. This prefetching mechanism may be triggered by the receipt of an incoming message destined for one of the application processes executing on that node.

As described in more detail below, in some embodiments, when the network interface (e.g., a network interface card) on a particular computing node receives an incoming function shipping message from another computing node, the network interface hardware may extract a reference to local data from the message. For example, the function shipping type messages received by the network interface card may all have the same format, and the network interface card may be configured to interpret the messages based on that format to extract the reference to the local data. In some embodiments, after extracting the reference to the local data, the network interface card may initiate a fetch on the referenced data. For example, the network interface card may interact with a local last level cache prefetcher to issue one or more prefetch operations for prefetching the referenced data into the local last level cache. The network interface card may then store the message (or the request contained therein) in main memory (e.g., in a local list, buffer, or queue) from which a processor core on the computing node may subsequently access it for interpretation and processing. When the processor code accesses the stored message (or request thereof) and attempts to process the request, it may find that the data referenced in the message (or request) may have already been prefetched into the cache by the network interface card.

In some embodiments, the network interface hardware may be configured to support such a message driven prefetching mechanism, and this mechanism may be software controlled. In some embodiments, the mechanism may provide an interface through which a parallel data-intensive application that employs function shipping may configure the network interface hardware to interpret the incoming messages and initiate the prefetching of the referenced local data. In some embodiments, the message driven prefetching mechanism described herein may significantly reduce processor stall times when executing parallel applications in this class, including, but not limited to, graph processing and graph search applications.

One embodiment of a method for performing message driven prefetching at a network interface is illustrated by the flow diagram in FIG. 1. As illustrated at 110, in this example, the method may include a network interface component on one of multiple computing nodes that are collectively executing an application that uses function shipping receiving a message from another one of the computing nodes. The method may include the network interface component extracting from the message a reference (e.g., an address or pointer) to data that is stored locally (e.g., data to be operated on locally as part of executing the application), as in 120. The method may also include the network interface component determining the physical location and extent of the referenced data, and communicating this information to a local prefetcher, as in 130. For example, in some embodiments, the computing node may include a last level cache prefetcher. In such embodiments, the network interface component may be configured to pass to this prefetcher an indication of the physical location of the data that is referenced in the message (e.g., the starting address of the data to be prefetched or a pointer to the first location from which data should be prefetched) and/or the amount of data to prefetch (e.g., the number of data items to be pre-fetched, the number of bytes of data to be pre-fetched, or an address or pointer identifying the last physical location from which data should be pre-fetched).

As illustrated in this example, the message may include the local prefetcher prefetching the referenced data into a local cache, and sending an acknowledgement to that effect to the network interface component when the prefetching operation is complete, as in 140. The method may include the network interface component storing the received message locally (e.g., in a register or in a local data structure in main memory) for subsequent processing on the computing node, as in 150. For example, the message may be stored in a register, list, buffer, or queue of received messages from which it will be retrieved by a local processor at a later time. The method may subsequently include processing the message locally using the cached data (e.g., rather than fetching the reference data when the message is retrieved for processing), as in 160.

Note that, in various embodiments, each processor of each computing node that participates in executing a data-intensive computation may be a single core processor or a multi-core processor. Note also that each processor (or processor core) may include one or multiple levels of local cache, in different embodiments. For example, in computing nodes that include one or more single-core processors, there may be one (dedicated) local cache per single-core processor. In computing nodes that include one or more multi-core processors, there may be one local cache per multi-core processor that is shared by all of the processor cores (which may sometimes be referred to as a "last level cache") and/or one (dedicated) local cache per processor core.

Figure 2:
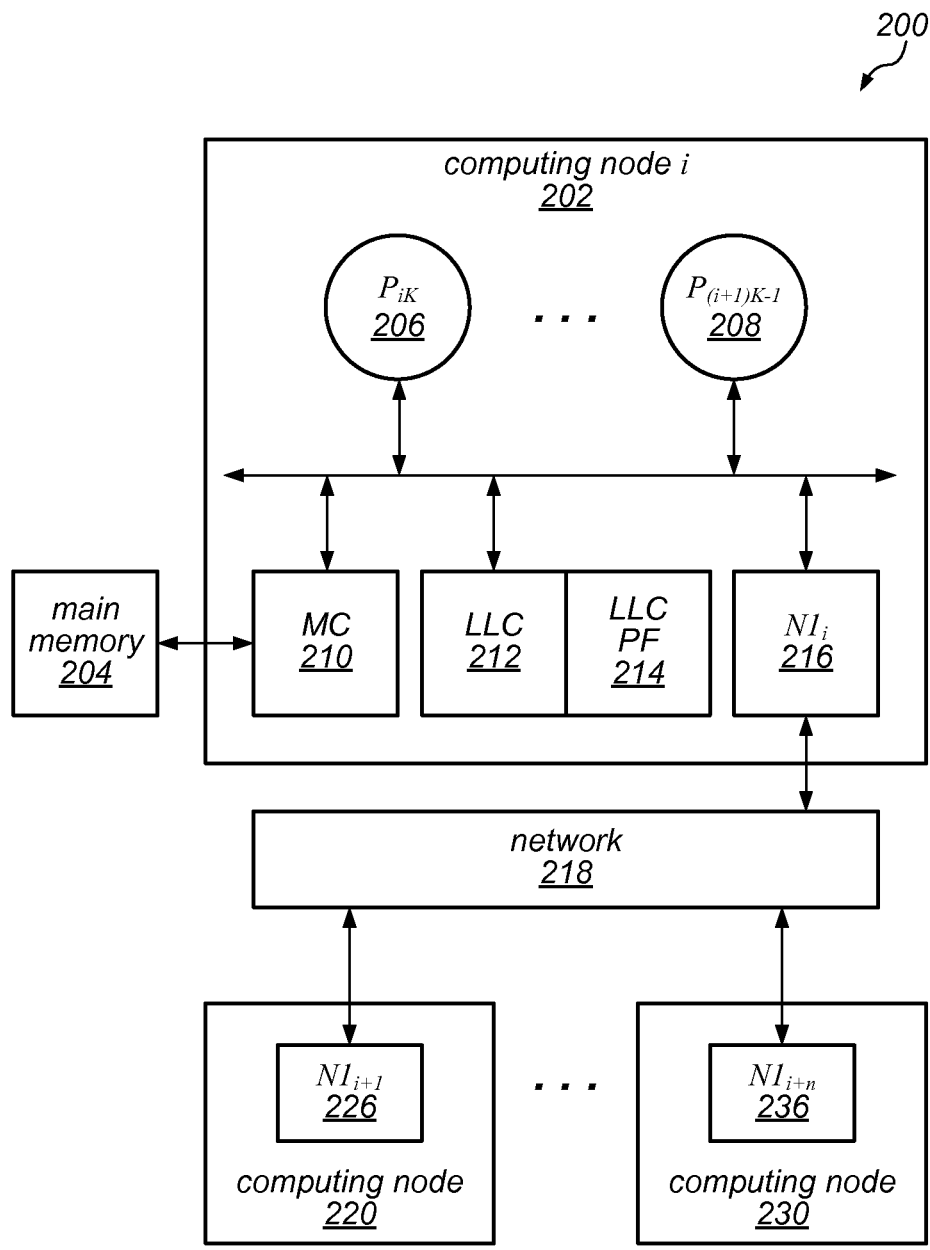
FIG. 2 is a block diagram illustrating a computing system with multiple computing nodes, according to some embodiments.

One embodiment of a computing system with multiple computing nodes that can collectively execute data-intensive application using the techniques described herein is illustrated by the block diagram in FIG. 2. As illustrated in this example, each computing node in such a system may include multiple processors (each of which may include one or more caches), a last level cache (e.g., one that is shared by the multiple processors), a prefetcher associated with the last level cache, a memory controller, and a network interface (NI) that receives and sends messages. More specifically, FIG. 2 illustrates an example high level architecture of a portion of a computing system 200, and illustrates a single computing node i (202) in more detail than the other computing nodes in the system. In various embodiments, computing node 202 may be implemented as a single socket computing node (e.g., with the illustrated components integrated on a single processor chip) or using multiple integrated circuit devices.

In this example, the last level cache (shown as LLC 212) may be shared by all CPU cores (e.g., one or more CPU cores on each of multiple processors 206-208) and may include a prefetcher (shown as LLC prefetcher 214) that is configured to prefetch data into the LLC 212 from main memory 204 when given a physical address. In the example computing node i 202 illustrated in FIG. 2, each of the processors $P_p$ (206-208) represents a processor with ID p, where the value of p is in the range iK to (i+1)K−1, and where K is the number of processors on node i. In this example, the network interface component for computing node i 202 is shown as $NI_i$ 216. Computing node i (202) also includes a memory controller (MC 210) that controls accesses to main memory 204. In various embodiments, main memory 204 may be resident on the same integrated circuit device as one or more of the components of computing node i 202 or may be resident on a separate integrated circuit device.

In this example, other computing nodes in system 200 (including, e.g., computing node i+1 220 and computing node i+n 230) may have an architecture substantially similar to that of computing node i 202. For example, each may include a network interface (e.g., network interfaces 226 and 236) through which it receives message from and sends messages to other ones of the computing nodes, and may also include components similar to any or all of the other components illustrated in FIG. 2 as being resident in node 202 (not shown).

As illustrated in the following table, in some embodiments, a data-intensive application (e.g., one executed in a distributed system of computing nodes) may employ shared memory primitives fir communication between processes (or threads) within a single computing node and may employ message passing for inter-node communication. For example, the system model illustrated below may be employed in a system in which the target application is a data-intensive workload and in which the target application is executing (collectively) of the computing nodes in the system.

TABLE 1

System Model for Data-Intensive Applications
System Model

|  | On a single node: | Node-to-Node: |
| --- | --- | --- |
| Memory model: | Shared address space | Distributed address space |
| Parallel programming: | Independent threads, shared data structures | Independent threads, independent data structures |
| Communication interface: | Load/Store instructions | Explicit direct messaging |

Figure 3:
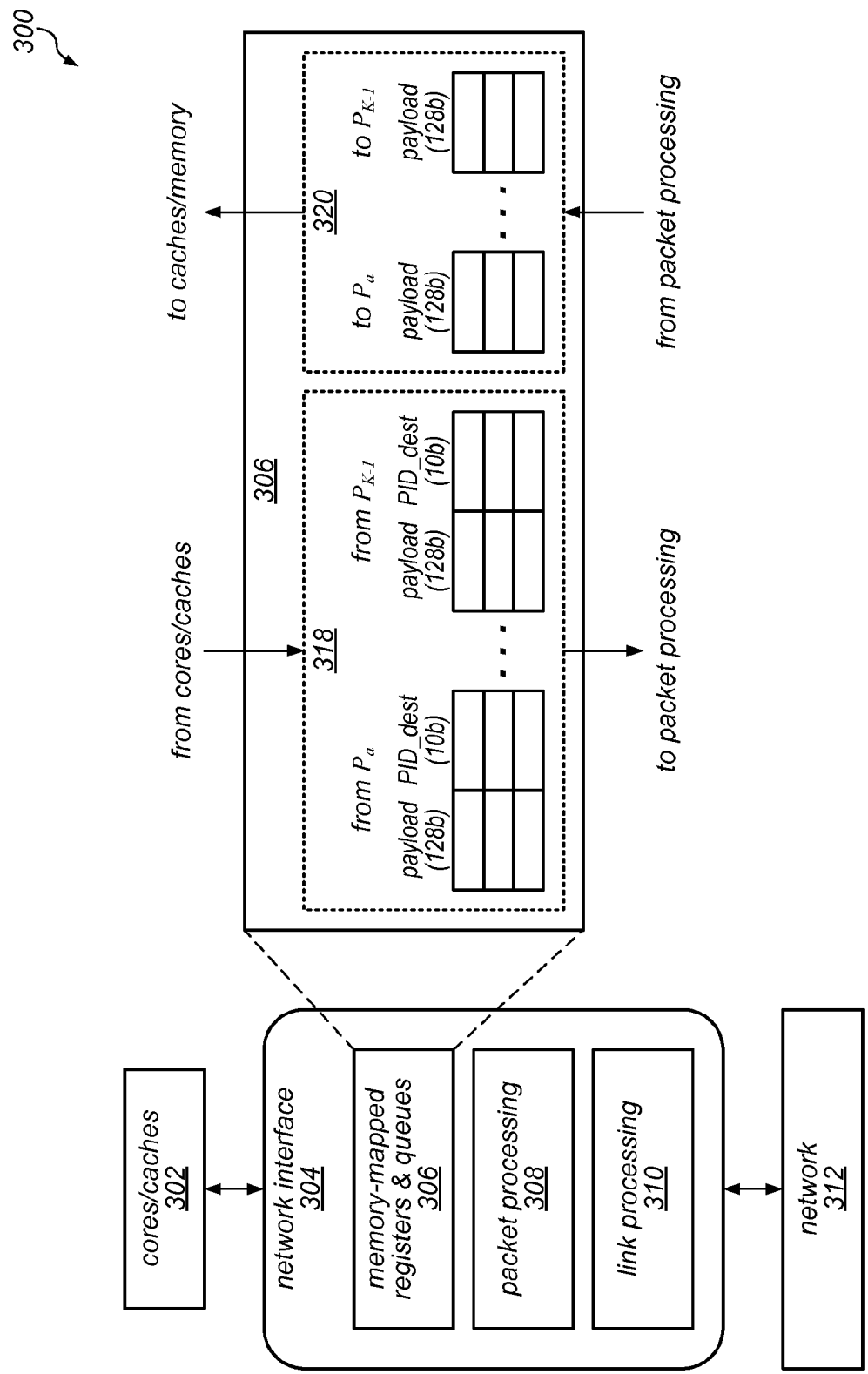
FIG. 3 is a block diagram illustrating a network interface that includes user level messaging support, according to some embodiments.
Figure 6:
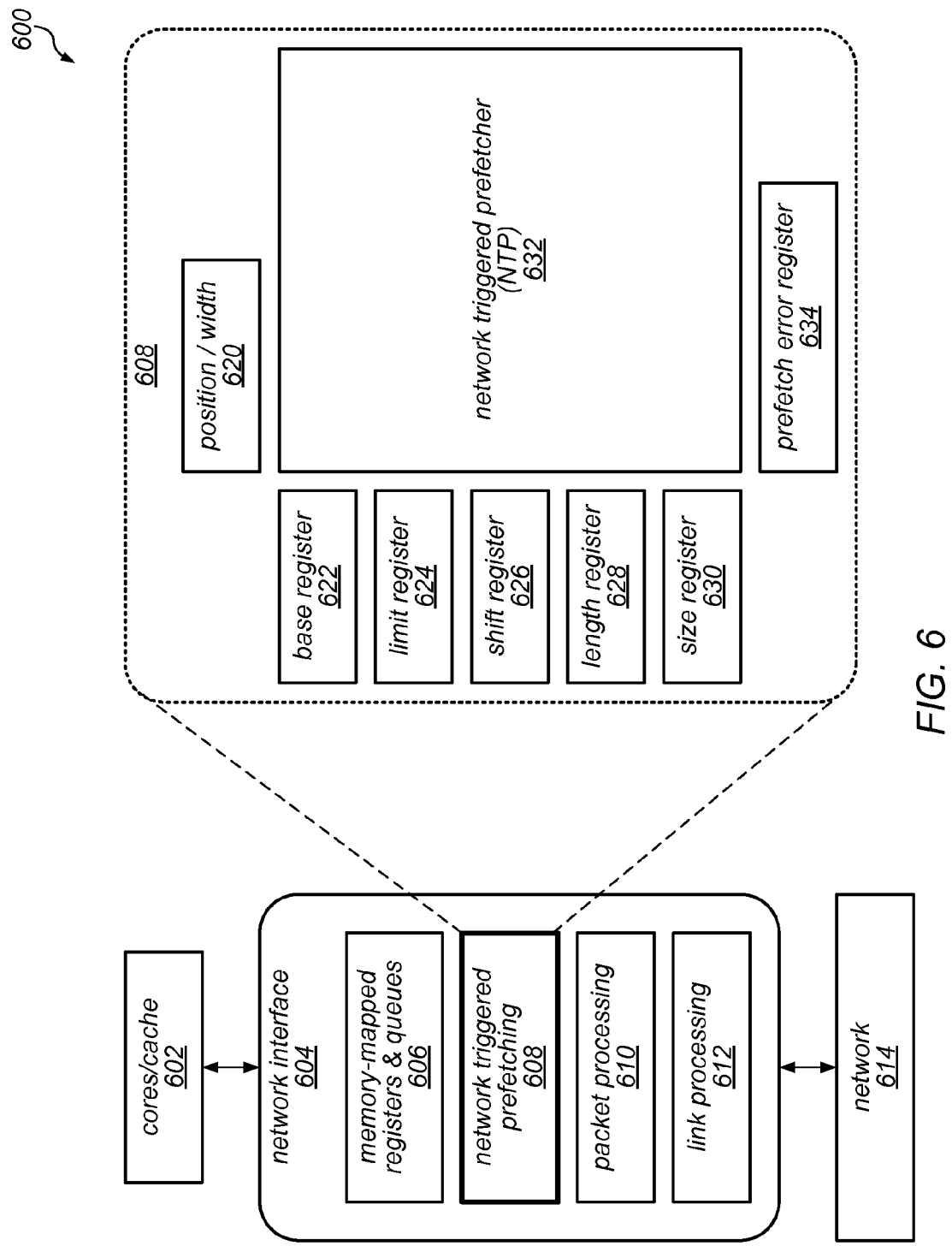
FIG. 6 is a block diagram illustrating a network interface that includes support for message driven prefetching, according to some embodiments.
Figure 7:
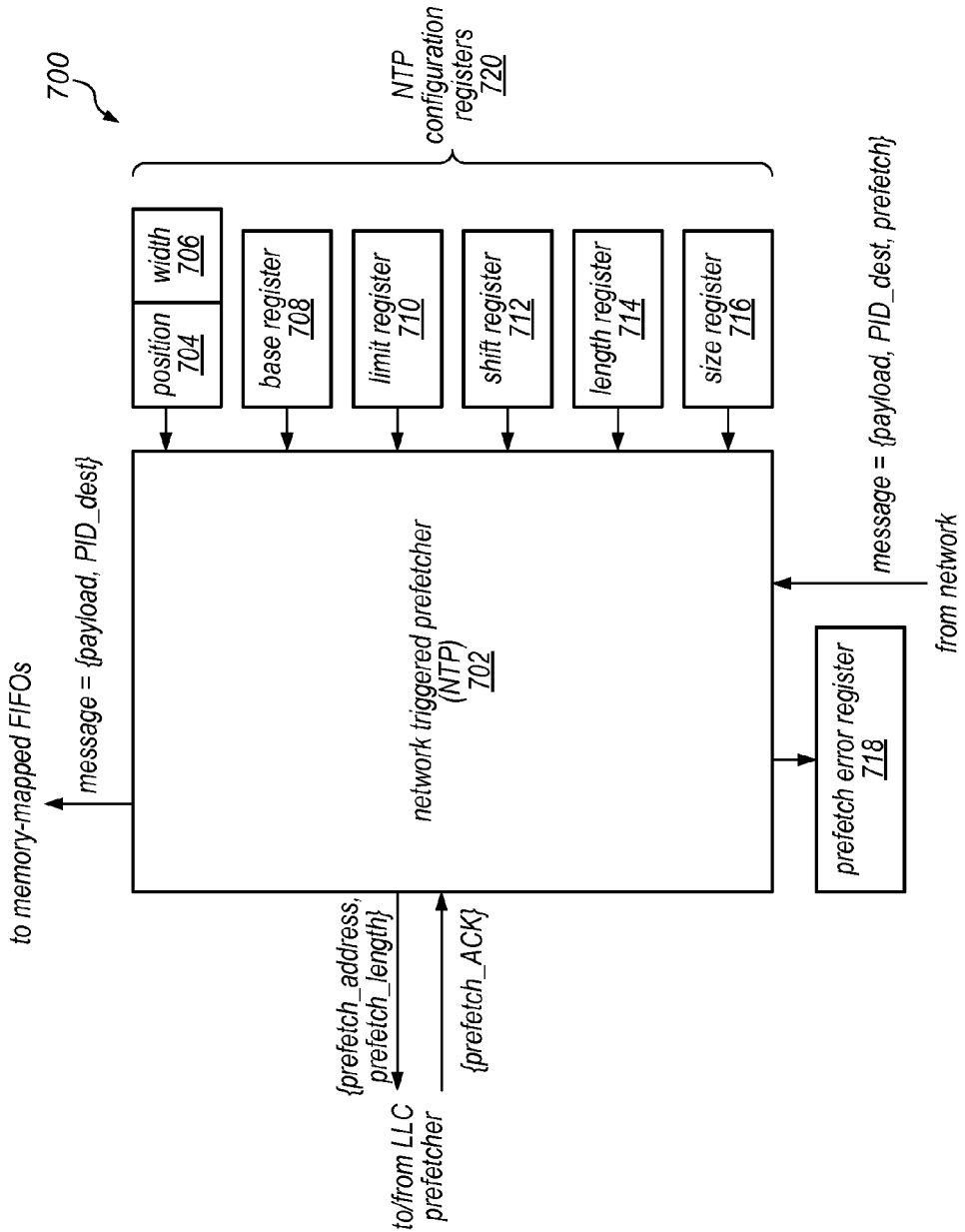
FIG. 7 is a block diagram illustrating the components and functionality of a network-triggered prefetcher, according to some embodiments.

One embodiment of a network interface component that includes user level messaging support (e.g., support for a function shipping model) is illustrated by the block diagram in FIG. 3. In this example, the network interface component does not include support for message driven prefetching. However, as illustrated in FIGS. 6 and 7 and described in more detail below, network interface components that include support for message driven prefetching may include elements similar to those illustrated in FIG. 3 and may support functionality similar to that of the network interface component illustrated in FIG. 3. For example, both network interface components that include support for message driven prefetching and network interface components that do not include support for message driven prefetching may send messages to and receive messages from network interface components of other computing nodes over a network, and may send messages to and receive messages from local processors (or from processor cores, caches, or memory associated with those processors). For example, a message that is to be sent out over the network may be received by the network interface component from a local processor core, or a message that to be directed to a local processor core may be received by the network interface component from the network.

In this example, it is assumed that various registers, fields, queues, and/or other elements of the network interface component are memory mapped (e.g., to particular addresses). Therefore, regular load operations may be used to read the values stored in these registers, fields, queues, and/or other elements and regular store operations may be used to write values to them (e.g., to populate them). For example, to send a payload out on the network, a message sent by an application (or a thread or process thereof) may specify the payload (e.g., by including a payload itself or an address of the payload) and an appropriate remote destination for the payload (e.g., by including an identifier of a processor on other computing node that is intended process the message). Similarly, when a message is received from the network, the message may include a payload (e.g., it may include the payload itself or an address of the payload) and an identifier of the local processor that is intended to process it.

More specifically, FIG. 3 illustrates an example architecture of a portion of a computing node 300 that includes a network interface component 304 and multiple processor cores (and associated caches) 302, and that communicates with other components of computing node 300 (or of a computing system that includes computing node 300) over network 312. In this example, network interface component 304 supports user-level messaging that may be used for node-to-node communication (e.g., in applications that employ a function shipping model). In this example, to send a small message, a user process may push a payload and destination ID into a set of memory mapped registers and queues (e.g., one of registers 318 within memory mapped registers 306) at network interface component 304 using regular store instructions. Similarly, incoming messages may be received by issuing load instructions to the memory mapped receive registers (e.g., one of registers 320 within memory mapped registers 306). As illustrated in this example, network interface component 304 may also include a packet processing engine (PPE) 308 (which may pack and/or unpack messages sent from or received by network interface component 304 or perform other pack processing functions) and other protocol processing hardware, such a link processing component 310.

As illustrated in this example, memory mapped registers 306 may include a set of registers 318 that include, for each processor $P_p$ (e.g., processors 206-208 of FIG. 2), a list or queue of payloads and destination information (e.g., PID_dest information) for outgoing messages. Memory mapped registers 306 may also include a set of registers 320 that include, for each processor $P_p$ (e.g., processors 206-208 of FIG. 2), payload information that was extracted from incoming messages and directed to that processor. In other words, each of registers 320 may implement a queue of received messages (or information extracted from them) that is to be sent to the caches/memory associated with a particular processor for subsequent access and/or processing by that processor (or a core thereof).

Figure 4:
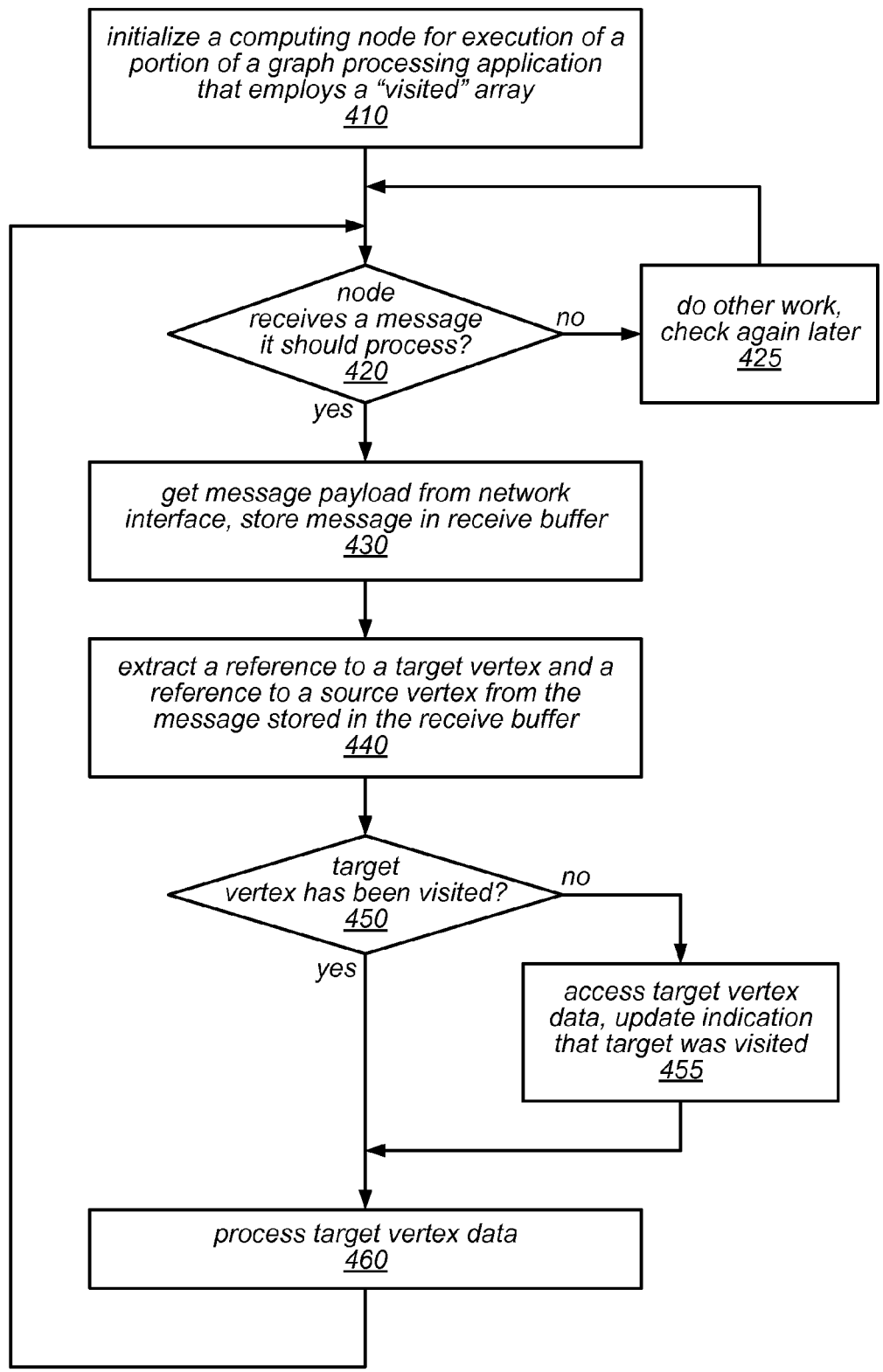
FIG. 4 is a flow diagram illustrating one embodiment of a method for performing a graph processing application, as described herein.

As noted above, a variety of different types of applications may employ a function shipping model, including graph search or graph processing algorithms (such as a BFS graph kernel). One embodiment of a method for performing a graph processing application (e.g., one that may benefit from the use of the message driven prefetching mechanisms described herein) is illustrated by the flow diagram in FIG. 4. Note that the example graph processing application described in FIG. 4 is similar to the graph processing application represented by the example pseudo code shown below. As illustrated at 410, in this example, the method may include initializing a computing node for execution of a portion of a graph processing application that employs a visited array. In this example, it may be assumed that all of the computing nodes on the network that are participating in execution of the graph processing application store a portion of the visited array (e.g., the data in the visited array is striped across all of these computing nodes, and each node is responsible for processing the portion of the visited array that is stored locally). While the computing node waits to receive a message that it should process, it may perform other work (e.g., processing messages for the graph processing application that were received earlier, performing other work on behalf of the graph processing application, or performing work other than that of the graph processing application, in different embodiments) and may check for incoming messages again later (e.g., periodically polling the network interface of the computing node to see if any messages have arrived). This is illustrated in FIG. 4 by the negative exit from 420 and element 425.

If (or once) the computing node receives a message it should process (shown as the positive exit from 420), the method may include getting the message payload from the network interface through which it was received, and storing the message in data structure (e.g., a receive buffer) in the local system memory (i.e., in main memory), as in 430. The method may include extracting a reference to a target vertex (e.g., a target vertex ID) and/or a reference to a source vertex (e.g., a source vertex ID) from the message stored in the receive buffer, as in 440. If the target vertex has not yet been visited (shown as the negative exit of 450), the method may include beginning an attempt to access the target vertex data. In this case, since the target vertex has not yet been visited, its associated data is not likely to be found in a cache on the computing node. Therefore, it may take a long time to fetch this data from system memory. Once the data has been fetched, the method may include updating the indication that target has been visited, as in 455. However, if (or once) the target vertex has been visited (shown as the positive exit from 450 or the exit from 455), the method may include processing the target vertex data, as in 460. After processing the target vertex data, the method may include polling the network interface to determine if/when there are more incoming messages to process. This is illustrated in FIG. 4 by the feedback from 460 to 420.

The pseudo code below illustrates a simplified example of the code of a graph processing benchmark (e.g., a parallel BFS graph kernel), which is similar to that illustrated in FIG. 4 and described above. As illustrated in this example, a process/thread of the application may perform asynchronous receive operations by polling the network interface card to check for incoming messages, and the payload of each message may be 16 bytes. Upon receiving a message, the process/thread may access a local data structure referenced by the content in the received message. More specifically, each of the received messages may identify a particular node (or vertex) of a graph, and the process/thread that receives the message is configured to check a Boolean array (the visited array) to determine whether (or not) that vertex has ever (previously) been visited.

As shown in the example pseudo code below, a process/thread may (e.g., periodically or repeatedly) call a function pollNIC to poll the network interface card. If and when this function returns a value of "1", this indicates that the process/thread has received a message that it needs to process. As illustrated in this example, the message may include a target and a source. After receiving the message, the process/thread may extract a vertex ID from the message (e.g., in the first portion of the payload) that identifies a particular vertex (the target). After extracting the target from the message, the process/thread may consult the visited array with the extracted portion of the message (the target vertex ID) used an index into the array. If the visited array contains a value that has been set to "true" for that vertex ID, this indicates that the process/thread has already visited the target vertex, and does not need to do any further processing for that vertex, but can move on to do other useful work. However, if the visited array indicates that the value for that vertex ID is "false" (e.g., if the value is zero or a NULL value), this means that the target vertex has not yet been visited and the process/thread needs to do further processing for that vertex before doing other useful work (not shown). As illustrated in this example, the process/thread may set the value for the target vertex in the visited array to "true" immediately before processing that vertex. In other embodiments, the process/thread may not set the value for the target vertex in the visited array to "true" until it has finished processing that vertex, or at some intermediate point during the processing of the target vertex.

```
size_t nlocalvertices = "some large value that cannot be cached';
int ulong_bits = sizeof ( unsigned long ) * 8;
int64_t visited_size = ( nlocalvertices + ulong_bits − 1 ) /
ulong_bits;
visited = ( unsigned long *) calloc ( visited_size * sizeof unsigned long )
);
int64_t receive_buffer[2];
...
if (pollNIC ( ) = = 1);
{
    receive_buffer = get_payload_from_NIC ( );
    int64_t target = receive_buffer[0];
    int64_t source = receive_buffer[1];
    if ( !visited[target] ) {        // an LLC miss here can cause a stall to
    memory
        visited[target] = true;
        ...
    }
    else
        // do other useful work
        ...
```

In this example graph search/processing application, based on the contents of a received message (more specifically, the target vertex ID), a process/thread may need to consult a data structure (i.e., the visited array) that is maintained in its local memory (i.e., it may access a particular location in memory that stores the element of the data structure that is identified in the message). Then, based on the value stored at that location, the process/thread may or may not do further processing. In this example, a delay may be encountered when attempting to access the element of the array pointed to by the target vertex ID, e.g., during the operation, "if(!visited[target])". For example, if the value that the process/thread is looking for (e.g., the value of the element of the array pointed to by the target vertex ID) is not in its local cache (e.g., if it is not in the last level cache on the computing node on which the process/thread is executing), this may result in a large delay while the value is fetched from memory.

In some graph processing or graph search applications, the data set (e.g., a visited array, or a portion of a visited array that is maintained locally on a particular computing node) may be very large, and the distribution of the values for the target that are received in messages directed to the computing node (or a processor core thereof) may be fairly random (i.e., any message may indicate an element anywhere in the array). Therefore, in existing systems, it may take a very long time to fetch an element of the array that is referenced in a message after receiving the message. For example, it may take hundreds or thousands of cycles to fetch the referenced array element from memory, as opposed to taking only of cycles to fetch the referenced array element from a cache. Once the referenced array element is fetched from memory, the array element value may be set to "true" and this new value may be cached. However, when the data set is very large (i.e., for very large computations), the visited array may be too large to be cached on a single computing node, which may result in cache misses when attempting to access an element of the array immediately after receiving a message.

In some embodiments of the systems described herein, the desired array element values may often be fetched early (e.g., before they are needed for processing) and may (in those cases) be resident in the cache (e.g., in the last level cache) when it is time to examine them (e.g., as in the "if(!visited[target])" operation shown above). For example, in some embodiments, the network interface card may initiate the fetching of each value referenced in the messages it receives as soon as they are received, and the processor (or processor core) that is to process each message may be woken up once the data it is to operate on has been fetched. At that point, the processor may immediately find the data it needs in the cache (i.e., it may not have to wait for this data to be fetched from memory after reaching the "if(!visited[target])" operation. Note that the types of accesses that are made by graph processing or graph searching applications (such as those described above) are common to other types of parallel applications that are implemented using a function shipping model. In various embodiments, execution of these other types of applications may also benefit from the use of the message driven prefetching mechanisms described herein.

Figure 5:
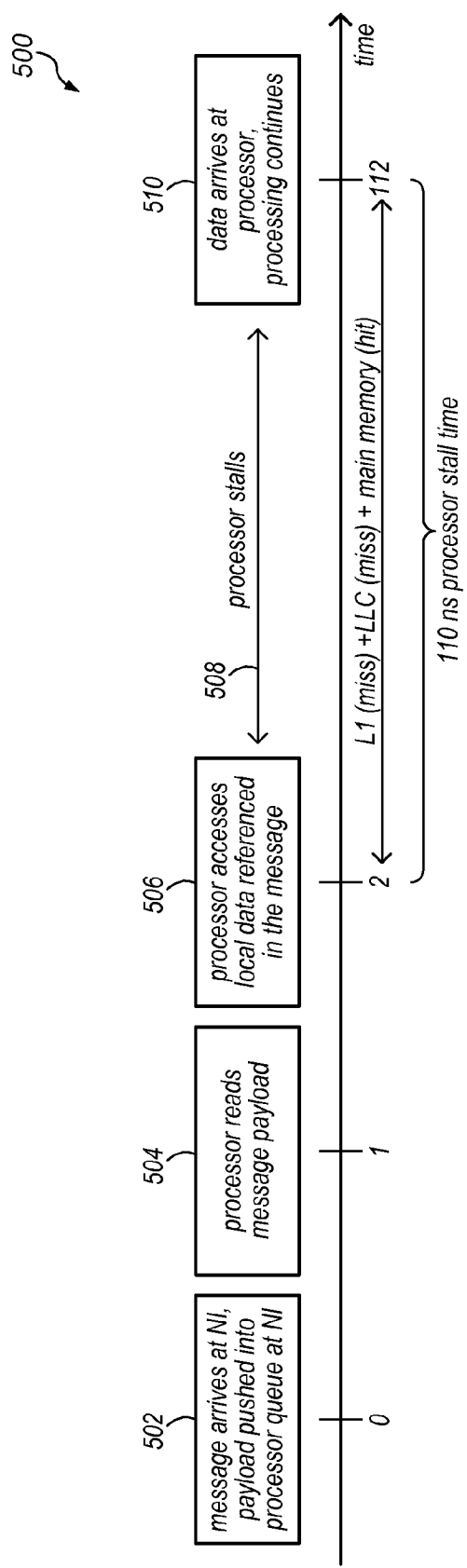
FIG. 5 is an execution timeline illustrating a processor stall in a computing node without message driven prefetching, according to some embodiments.

The potential performance issues that may be improved by using the message driven prefetching mechanisms described herein may be further illustrated by the timeline in FIG. 5. In this example, a parallel BFS graph kernel (such as that described above) may, when executed on a baseline architecture (such as that shown in FIGS. 2 and 3) produce a timeline such as that illustrated in FIG. 5. As noted above, in big-data applications, such as in the example code snippet shown above, the local data access may always result in a cache miss due to the large data set size and the lack of locality in its accesses to local data. This may result in wasted CPU time (e.g., CPU time that could have been used to perform useful computations) while waiting to fetch data from memory. As described in more detail below, FIG. 5 is a timeline illustrating a case in which the processor stalls following receipt of a new message, while waiting to fetch the data referenced in the message.

FIG. 5 is an execution timeline illustrating a processor stall in a computing node without message driven prefetching, according to some embodiments. For example, the timeline illustrated in FIG. 5 represents the handling of an example message that is received by a network interface component that does not support message driven prefetching or by a network interface component for which a message driven prefetching feature is not enabled. In the example timeline 500 illustrated in FIG. 5, a message arrives at the network interface component at some time designated as time 0 (for this message) and its payload is pushed into a local data structure (e.g., a processor queue) at the network interface component (such as one of the processor queues 320 in FIG. 3) for subsequent processing (as in 502). In this example, at time 1 (e.g., 1 ns later), the processor reads the message payload (as in 504) and at time 2 (or 2 ns after the message arrived at the network interface component) the processor attempts to access the local data referenced in the message (as in 506). In this example, the referenced local data is not available in the caches of the computing node on which the network interface component resides and must be fetched from main memory, causing a processor stall (as in 508). More specifically, the processor attempts to locate the referenced data in its caches. However, subsequent to a level 1 cache miss and a last level cache miss, it successfully locates the referenced data in main memory, taking a total of 110 ns. In this example, the data arrives at the processor at time 112 (e.g., 112 ns after the message arrived at the network interface component), at which point processing continues (as in 510).

Prefetching the local data (e.g., using software prefetching) could, theoretically, save some or all of the wasted cycles shown in the example illustrated in FIG. 5. However, since the local data that will be needed is not known until it is referenced in an incoming message, the processor (or processor core) that needs the local data does not have enough information to issue a prefetch ahead of time. In some embodiments, the systems described herein may address this issue by incorporating message driven prefetching support in the network interface (e.g., in the network interface card). As described in detail herein, systems that employ such message driven prefetching may avoid processor stalls such as the processor stall illustrated at 508 in FIG. 5. For example, the network interface may be configured to prefetch local data that is referenced within each received message (e.g., data in a referenced element of the visited array) into the cache (e.g., the last level cache) when the message is received (i.e., before any processor or processor core attempts to access the referenced data). The network interface may let the processors (or processor cores) that are to process the prefetched data know that it has received the data they need, after which the processors (or processor cores) will be able to find the prefetched data in the cache (e.g., in the last level cache) without having to stall as often.

In some embodiments, there may be a lag between when each message is received by the network interface and when it is to be processed, during which time local data referenced in the message may be prefetched using the message driven prefetching mechanisms described herein. In other embodiments, a group of messages may be received and buffered up before processing of any of the messages begins. In one example, there may be on the order 256 requests (e.g., 256 requests, each 16 B long) to process particular data structure elements received by the network interface in one long message (e.g., a 4 KB long message). In such embodiments, the network interface card of the recipient computing node may initiate the prefetching of the data referenced in each of the requests in the message into the cache (e.g., the last level cache) as soon as it starts receiving them. The network interface may store each of the requests locally (e.g., in a local register or in main memory, e.g., in a local list, buffer, queue, or any other suitable data structure) on the recipient computing node after (or prior to) prefetching the data referenced in the request, or may store all of the requests in a local register, list, buffer, or queue on the recipient computing node after (or prior to) prefetching all of the data referenced in all of the requests in the message, in different embodiments. The processors (or processor cores) on the recipient computing node may begin processing the requests in the message in turn (e.g., iterating over the messages stored locally in the register, list, buffer or queue in a loop, with or without waiting for the entire long message to be buffered before beginning to process the first request). In some embodiments, as the processors (or processor cores) of the recipient computing node access and process individual buffered requests that were included in the message (and for which the data has been prefetched), the network interface card may continue to prefetch the data referenced in subsequent ones of the requests, allowing that data to be available to the processors or processor cores when they access and process the corresponding requests.

In some embodiments of the systems described herein, the network interface component of each of the computing nodes may include dedicated hardware support for message driven prefetching. For example, in some embodiments, in order to support prefetching at the network interface, a network-triggered prefetch engine, which is sometimes referred to herein as a network-triggered prefetcher (NTP), may be implemented within the network interface component. In such embodiments, the network interface component may be configured to prefetch data items or data structures that are associated with received network messages in an attempt to minimize processor stalls. One embodiment of a network interface that includes support for message driven prefetching is illustrated by the block diagram in FIG. 6. More specifically, FIG. 6 illustrates a portion of a computing node 600 that includes a network interface component 604. In this example, network interface component 604 includes elements similar to those of network interface 304 illustrated in FIG. 3 (e.g., memory mapped registers and queues 606, packet processing 610, and link processing 612). Network interface component 604 may exchange messages with various local processor cores (and associated caches) 602 and may communicate with other components of computing node 600 (or of a computing system that includes computing node 600) over network 614. As in the example illustrated in FIG. 3, network interface component 604 may support user-level messaging that may be used for node-to-node communication (e.g., in applications that employ a function shipping model).

As illustrated in FIG. 6, in some embodiments, the network interface component may also include a network-triggered prefetching component, which may be integrated into the network interface between a component that provides packet processing functions (shown as packet processing component 610) and a collection of memory mapped registers and queues 606 (which may be substantially similar to those included in network interface component 304 illustrated in FIG. 3). In this example, the network-triggered prefetching component 608 includes registers and associated control logic to implement the message driven prefetching functionality described herein. For example, network-triggered prefetching component 608 may include a network-triggered prefetching (NTP) engine (shown as NTP 632) that acts as the control logic, and a set of seven configuration registers (which are described in detail below) that may be configured at the start of an application to enable message driven prefetching for that particular application. In some embodiments, these configuration registers may be memory mapped and may be accessed by the application (or a processor thread thereof) using conventional load/store type instructions. In general, any or all memory mapping and protection mechanisms used a conventional network interface component architecture (such as that illustrated in FIG. 3) may be extended to include these additional registers.

In some embodiments, the values stored in the configuration registers of network triggered prefetching component 608 inform NTP 632 about the data structure that stores data items that are referenced in incoming messages and that are to be operated on by a local processor, and/or how to interpret the messages received by network interface component 604 (e.g., how to interact with the data structure to prefetch the values of referenced data items into a local cache). In other words, the configuration registers may provide a mapping between the values of various fields within the incoming messages to something meaningful in the control logic of NTP 632. In some embodiments, when a message is received by network interface component 604, NTP 632 may interpret the message (extracting various elements within the message, according to the values in the configuration registers) to determine the location of the data that should be prefetched.

As illustrated in FIG. 6, one of the seven configuration registers is position/width register 620. In this example, position/width register 620 stores the position of an offset field in the incoming messages (e.g., the byte position of this field relative to the beginning of the message payload in each message) and the width of the offset field (e.g., in bits). In other words, the values stored in the position and width registers indicate which portion of each incoming message is relevant for determining the location of the referenced data in a locally stored data structure (e.g., which portion of the message represents the "target" field). In this example, the vales stored in the base and limit registers indicate the starting address of the data structure and the final address of the data structure. More specifically, base register 622 stores the base address of the data structure from which data is to be prefetched, and limit register 624 stores the last address of the data structure from which data is to be prefetched.

As described in more detail below (e.g., in reference to FIG. 7), in some embodiments, the offset value extracted from an incoming message based on the values stored in position/width register 620 may need to be shifted in one direction or the other before the address of the referenced data can be computed. In some embodiments, a shift register may control the amount and/or direction of such a shift. For example, shift register 626 illustrated in FIG. 6 may store a multiplier for the offset field in the message (thus indicating an amount by which the value extracted from the offset field in the message should be shifted during the computation of the prefetch address). In the example illustrated in FIG. 6, length register 628 may store the number of data items to be prefetched (beginning at the computed prefetch address), and size register 630 may store the size of each data item (e.g., in bytes). Note that in a scenario in which the number of data items is greater than one and at least some of the data items are of different sizes, the application may configure the registers such that the value stored in the length register is 1 and the value stored in the size register is equal to the total size of all items to be prefetched (e.g., in bytes).

In some embodiments, once the prefetch address has been calculated (according to values included in fields of a message and values stored in the configuration registers of NTP 632), the calculated prefetch address may be sent to a cache prefetcher (such as the LLC prefetcher 214 illustrated in FIG. 2) to initiate the prefetching of the referenced data. For example, the LLC prefetcher may be configured to fetch data into an associated cache (e.g., an LLC such as LLC 212 illustrated in FIG. 2) in response to being supplied with an address (and, in some embodiments, an indication of the amount of data to prefetch), and to return an acknowledgement when it has finished prefetching the referenced data.

In some embodiments, the network interface component may include some amount of error checking For example, in some embodiments, if the application passes a prefetch address to the network interface component that is outside the range of the targeted data structure (or passes a value to the network interface component that causes a prefetch address that is outside the range of the targeted data structure to be computed), the network interface component (or an NTP thereof) may flag an error. In other words, an error may be flagged when an incoming message attempts to access an out-of-bounds memory location. In some embodiments, if such an error is detected (or if a message driven prefetching operation fails for some other reason) an indication to that effect (e.g., a pre-defined value indicating a prefetching error or a specific type of prefetching error) may be stored in a memory mapped register so that the application (or application programmer) can determine what happened. In the example illustrated in FIG. 6, prefetch error register 634 may store various error codes in the event of an error that is related to message driven prefetching.

The operation of the network-triggered prefetching element 608 shown in FIG. 6 may be further illustrated by the block diagram in FIG. 7. FIG. 7 is a block diagram illustrating the components and functionality of a network-triggered prefetcher, according to some embodiments. As in the previous example, network-triggered prefetching element 700 may include a network-triggered prefetching (NTP) engine (illustrated in FIG. 7 as network-triggered prefetcher, or NTP, 702), which acts as the control logic for network-triggered prefetching element 700, and a set of seven configuration registers 720, which are similar to those described above in reference to FIG. 6. For example, NPT configuration registers 720 may include a register that includes a position field (704) and a width field (706) that collectively store information similar to that stored in position/width register 620 of FIG. 6. In addition, NPT configuration registers 720 may include a base register (708), a limit register (710), a shift register (712), a length register (714), and a size register (716), each of which may store information similar to that described above in reference to base register (622), limit register (624), shift register (626), length register (628), and size register (630) of FIG. 6.

In the example illustrated in FIG. 7, the inputs to NTP 702 may include the values stored in NTP configuration registers 720, information extracted from received messages, and prefetch acknowledgements (shown as prefetch_ACK) that are received from the cache prefetcher that prefetches referenced data on behalf of NTP 702 and network interface component 700 (e.g., an LLC prefetcher such as LLC prefetcher 214 illustrated in FIG. 2). For example, in some embodiments, the position (704) and width (706) fields within NTP configuration registers 720 may be set such that they indicate the location and size of the "offset" field in the message payload, respectively. Note that, in some embodiments, setting the width field (706) to a value of zero may disable message driven prefetching by NTP 702 for incoming message. In some embodiments, base register 708 may be set to the start address of a data structure from which referenced data is to be prefetched, limit register 710 may be set to the ending address of a data structure from which referenced data is to be prefetched, and shift register 712 may store a value indicating a shift for the offset extracted from an incoming message (e.g., a positive value may indicate a right shift, while a negative value may indicate a left shift). In some embodiments, the value of length register 714 may be set to the number of data items to be prefetched, and the value of size register 716 may indicate the size of each of those data items (e.g., in bytes).

As illustrated in this example, each of the messages received by the NTP 702 from a network may include a message payload, an identifier of a destination processor (PID_dest) and a bit (a "prefetch" bit) indicating whether message driven prefetching should be enabled for the message. The messages that are passed to memory mapped registers of the network-triggered prefetching element 700 by NTP 702 (e.g., to be placed in FIFO queues for various destination processors) may include the message payload and the identifier of the destination processor (PID_dest). As described herein, the payload portion of each of these messages (the size of which may be on the order of 128 b total) may include a data reference value (e.g., an identifier of, or pointer to, a data structure or memory region containing data to be operated on by the identified processor) and an offset value (e.g., a value usable to determine an address of one or more particular data items in the referenced data structure or memory region that are to be operated on by the identified processor). Note that the messages received by NTP 702 may include more, fewer, or different elements, in other embodiments.

As illustrated in FIG. 7, NTP 702 may be configured to calculate a prefetch address for the data that is referenced in a message based on information extracted from message and information stored in one or more of the configuration registers 720. For example, in some embodiments, NTP 702 may be configured to calculate the prefetch address as the sum of the value stored in base register 708 and the offset value extracted from the message (shifted, if appropriate, according to the value stored in shift register 712). This calculation may yield the address at which to locate the referenced data (e.g., within a particular data structure) in memory and from which to prefetch the referenced data into a cache (e.g., an LLC, such as LLC 212 illustrated in FIG. 2).

In the example embodiment illustrated in FIG. 7, the outputs communicated to the LLC prefetcher may be the prefetch address and a value representing the prefetch length (e.g., the number of bytes of data to be prefetched), which may be computed as follows:

prefetch_address=base+(sign (shift)>0 ? (offset>>shift): (offset<<shift))

prefetch_length=length×size

As previously noted, in some embodiments, the NTP (e.g., NTP 702) may be configured to test the computed prefetch address to determine whether it falls within the bounds of the data structure (or memory region) that contains the data to be operated on by a local processor. If not, the NTP may indicate such an error condition (or another error condition) by writing a predetermined value to a prefetch error register (such as prefetch error register 718 illustrated in FIG. 7). In the example illustrated in FIG. 7, the value stored in prefetch error register 718 as a result of a message driven prefetching operation may be computed as follows:

prefetch_error=!((prefetch_address≥base) && (prefetch_address<limit))||! prefetch_ACK In various embodiments, the addresses in the base register and limit register may represent virtual addresses (which may be independent of the implementation) or physical addresses (which may be dependent on the implementation). In embodiments in which they represent physical address, the system may be required to maintain the entire data structure in consecutive physical pages. The use of a virtual address may enable protection, in some embodiments. Note that systems that employ virtual addresses may also include a virtual-to-physical address translation mechanism at the network interface. In some such embodiments, the network interface may be integrated with the processor cores (e.g., on the same die), and may either share the CPU's translation lookaside buffer (TLB) or maintain a separate TLB for use in translating virtual addresses to physical addresses. In some embodiments in which the network interface includes its own separate TLB, this TLB may be implemented as part of a network triggered prefetcher, such as NTP 632 illustrated in FIG. 6 or NTP 702 illustrated in FIG. 7.

As noted above, in some embodiments, each of the messages received by the network interface from a network may include a message payload, an identifier of a destination processor, and a prefetch bit indicating whether message driven prefetching should be enabled for the message. One embodiment of a method for handling messages received by a network interface that supports message driven prefetching is illustrated by the flow diagram in FIG. 8. As illustrated at 810, in this example, the method may include a network interface component receiving a message from another computing node (i.e., a computing node other than the one on which the network interface component is implemented that is participating with that computing node in the execution of a parallel application). In response to receiving the message, the method may include the network interface component determining whether a prefetch bit in the message is set (as in 820). If the prefetch bit is not set (shown as the negative exit from 820), the method may include the network interface component on the computing node (or a network-triggered prefetcher or other component thereof) storing the received message locally (e.g., in a local register or in a local list, buffer, queue, or any other suitable data structure in main memory) for subsequent processing (as in 890) without first prefetching any data referenced in the message or initiating the prefetching of any data referenced in the message.

As illustrated in this example, if the prefetch bit in the message is set (shown as the positive exit from 820), the method may include the network interface component forwarding the message to a network-triggered prefetcher (NTP) on the computing node, as in 830. The method may include the NTP extracting an offset value from the message that represents a reference to data to be operated on locally (e.g., a value indicating the position within a locally-stored data structure at which the referenced data is stored) and, dependent on that information and information contained in various configuration registers on the network interface component, calculating a prefetch address (e.g., an address for the data to be prefetched) and the number of bytes to be prefetched, as in 840. For example, in some embodiments, the value(s) stored in a local configuration register (such as position/width register 620 in FIG. 6, or the position portion 704 and width portion 706 of one of the configuration registers 720 in FIG. 7) may indicate the position of the offset value within the message (e.g., relative to the start of the message payload) and its width, and the NTP may extract the offset value from that portion of the message. In this example, the NTP may then calculate the prefetch address and the number of bytes to be prefetched using the formulas shown above for computing prefetch_address and prefetch_length, respectively.

In some embodiments, the method may include the NTP performing a bounds check on the calculated prefetch address (e.g., using values stored in a base register and a limit register of the network interface component) and setting the error register value appropriately (as described above). For example, if the calculated prefetch address is out-of-bounds (shown as the positive exit from 850), the method may include the NTP setting the value of the error register to indicate this error, as in 855. In different embodiments, after such an error is detected, the method may include storing the message in a local register or in a local data structure (e.g., register, list, or queue of received messages) in main memory such that the error will be dealt with during message processing (as in 890) and/or returning an error indication to the message sender or to another hardware or software component involved in the execution of the parallel application (not shown).

Figure 8:
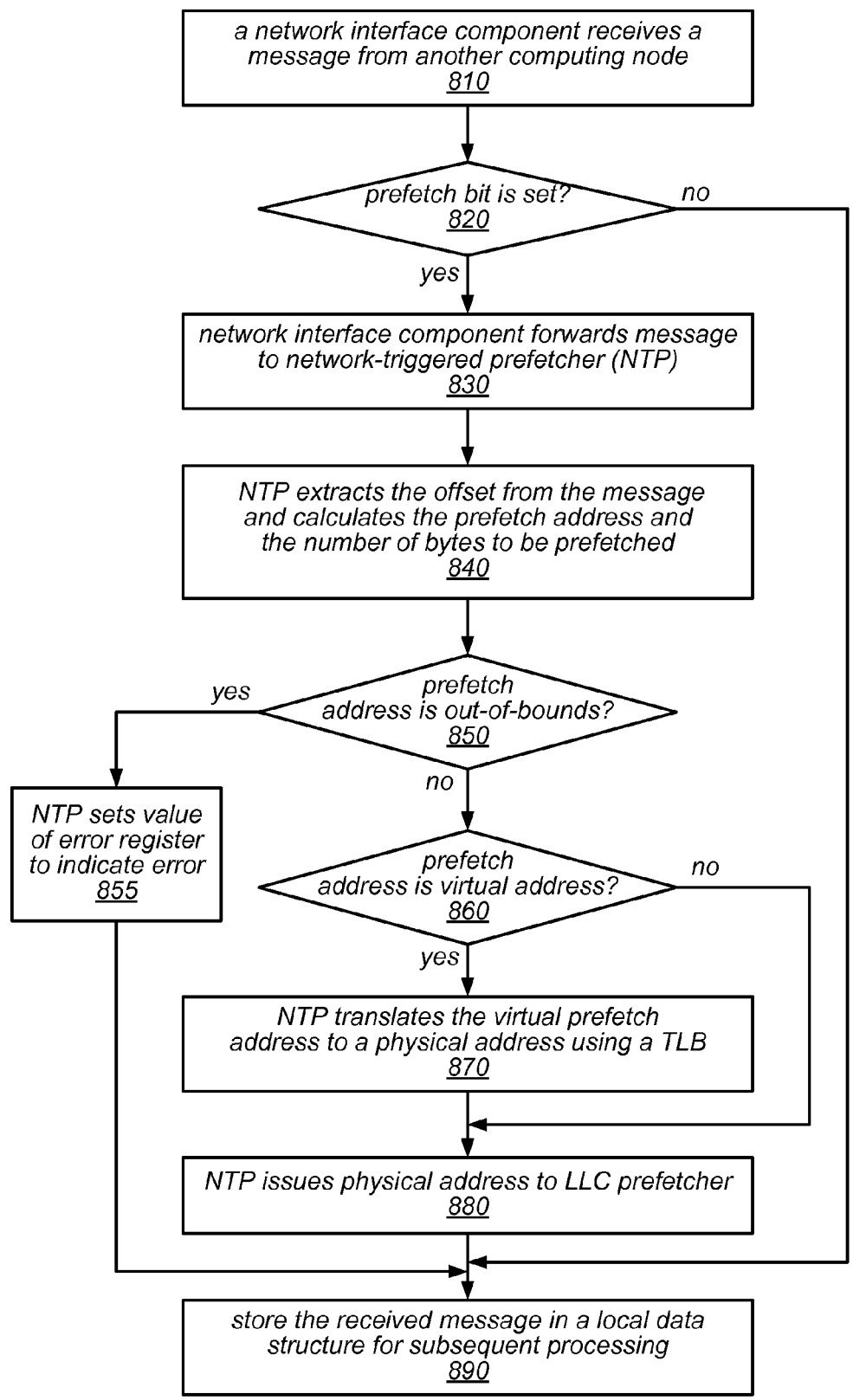
FIG. 8 is a flow diagram illustrating one embodiment of a method for handling messages received by a network interface that supports message driven prefetching, as described herein.

As illustrated in this example, if the calculated prefetch address is not out-of-bounds (shown as the negative exit from 850), and if the calculated prefetch address is a virtual address (shown as the positive exit from 860), the method may include the NTP translating the virtual prefetch address to a physical address using a translation lookaside buffer (TLB) of a local processor or using a private TLB of the network interface component or the NTP (as in 870). On the other hand, if the calculated prefetch address is not out-of-bounds (shown as the negative exit from 850) and if the calculated prefetch address is not a virtual address (e.g., if it is a physical address) no such translation may be performed. This is illustrated in FIG. 8 by the path from the negative exit of 860 to 880. Once a valid physical prefetch address has been generated (e.g., by the calculations described above, with or without translation from a virtual prefetch address), the method may include the NTP issuing that a valid physical prefetch address to a last level cache (LLC) prefetcher (thus initiating the prefetching of the referenced data), as in 880. Subsequently, the method may include the NTP storing the received message in a local register or in a local data structure (e.g., register, list, or queue of received messages) in main memory for subsequent processing, as in 890. In some embodiments, the NTP may not store the received message in the local register or data structure until the prefetching operation has been completed. For example, in some embodiments, when the prefetch operation initiated by the NTP is complete, the LLC prefetcher may send an acknowledgement to that effect back to the NTP. The NTP may then place the message in one of multiple memory mapped receive buffers (which may be FIFO buffers) in response to receiving that acknowledgement.

In some embodiments, the systems described herein may include an interface (e.g., an application programming interface) through which a collection of configuration registers (such as those illustrated in FIGS. 6 and 7) may be initialized or modified in order to support message driven prefetching for different types of parallel applications and/or for supporting message driven prefetching for messages having different contents and/or formats. For example, in some embodiments, when creating a parallel data-intensive application (or an application that includes a data-intensive parallel computation) to be executed in a system that supports message driven prefetching, the application developer may include in the application instructions (code) for distributing the data set to the collection of computing nodes that will operate over the data set. In some embodiments, the application developer may also include in the application instructions (code) for configuring the network interface cards of the computing nodes that will operate over the data set (e.g., by writing to the configurations registers in those network interface cards) so that during execution of the parallel computation, the network interface cards can process incoming messages and extract the information from the messages that is needed to implement message driven prefetching. For example, the payloads of the messages exchanged by various parallel applications under a function shipping model may include target and/or source information in different portions of those messages, and the configuration registers of the network interface cards may be programmed so that they can be extracted from the messages.

Note that in various embodiments, the network interface cards on the computing nodes of a system that supports message driven prefetching may include more, fewer, or different configuration registers than those illustrated in the examples herein. Note also that, in some embodiments, there may be default values for each of the configuration registers of the network interface cards that may be overridden by writing to them. In some such embodiments, the default values may cause the message driven prefetching feature to be disabled, and an application that wishes to take advantage of the message driven prefetching feature may need to write different values to one or more of the configuration registers of the network interface cards on each of the participating computing nodes in order to enable message driven prefetching for the application.

Figure 9:
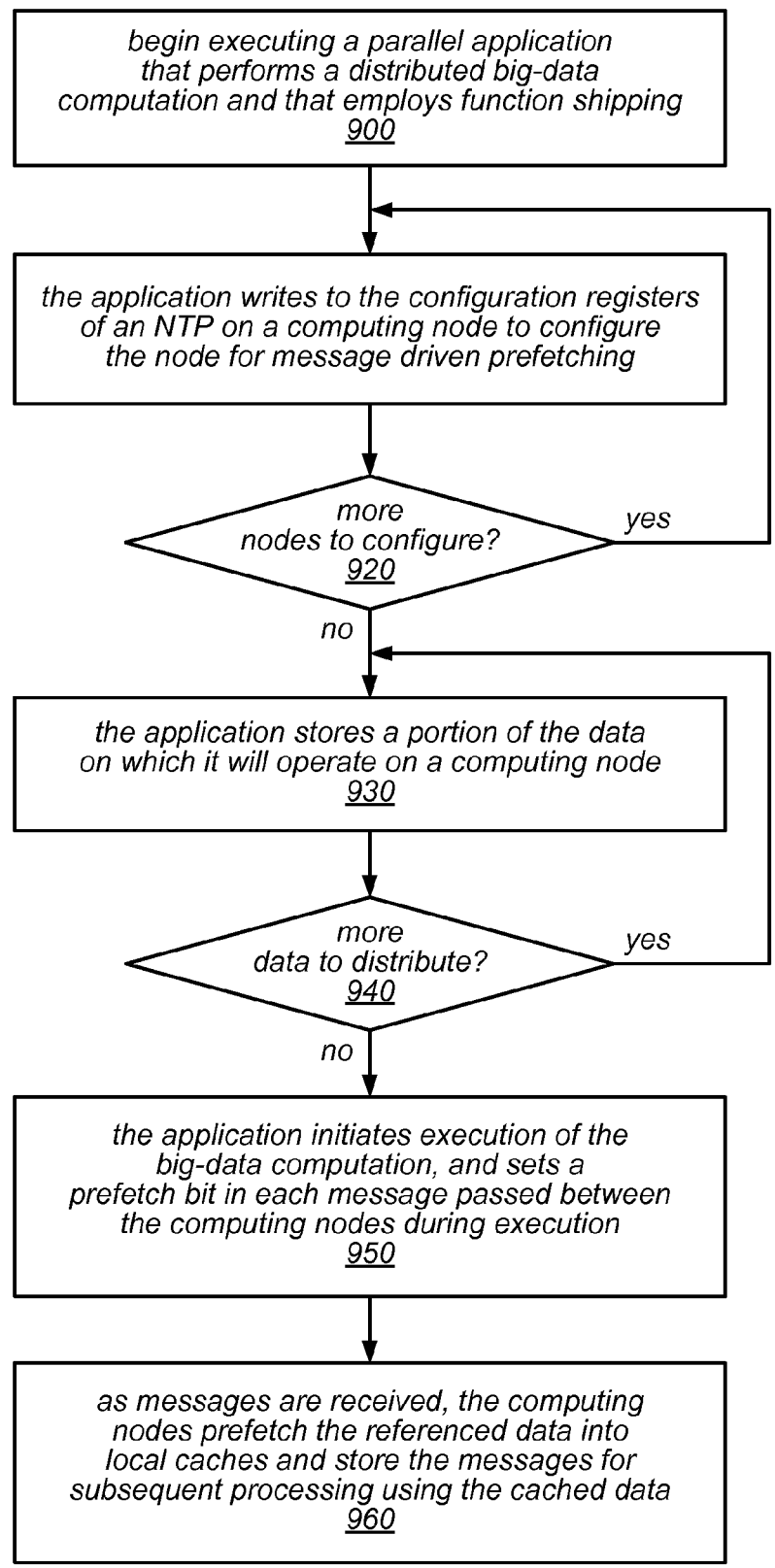
FIG. 9 is a flow diagram illustrating one embodiment of a method for configuring a collection of computing nodes for message driven prefetching, as described herein.

One embodiment of a method for configuring a collection of computing nodes for message driven prefetching is illustrated by the flow diagram in FIG. 9. As illustrated at 900, in this example, the method may include beginning execution of a parallel application that performs a distributed big-data computation and that employs function shipping. The method may include the application writing to the configuration registers of a network-triggered prefetcher (NTP) on a computing node to configure the computing node for message driven prefetching, as in 910. For example, the computing node may be one of multiple computing nodes that will be utilized in (collectively) performing a distributed big-data computation that employs a function shipping approach for inter-process or inter-thread communication. As described herein, in some embodiments, the values written to the configuration registers of the NTP when configuring the computing node for message driven prefetching may be dependent on the application, the content of the messages that are passed between computing nodes to perform the distributed big-data computation, and/or the format of the messages that are passed between computing nodes to perform the distributed big-data computation. In this example, while there are more computing nodes to configure for message driven prefetching, the operations shown in element 910 may be repeated. This is illustrated in FIG. 9 by the feedback from the positive exit of 920 to 910.

In this example, once all of the computing nodes involved in the distributed big-data computation have been configured for message driven prefetching (shown as the negative exit from 920), the method may include the application storing a portion of the data on which it will operate on a computing node (as in 930). For example, a portion of a large data set on which the distributed big-data computation will operate may be stored on each of multiple computing nodes that will be utilized in (collectively) performing the distributed big-data computation. In this example, while there is more data to distribute among various computing nodes, the operations shown in element 930 may be repeated. This is illustrated in FIG. 9 by the feedback from the positive exit of 940 to 930.

Once all of the data to be operated on by the big-data computation has been distributed on the computing nodes involved in the computation (shown as the negative exit from 940), the method may include the application initiating the execution of the big-data computation (as in 950). As illustrated in this example, the application may set a prefetch bit in each message that is passed between the computing nodes during execution (e.g., to enable a message driven prefetching feature of the network interface components of those computing nodes), as in 950. During execution of the big-data computation, the method may include, as messages are received, the computing nodes prefetching the data that is reference in those messages into local caches (e.g., LLCs) on those computing nodes, and storing the messages locally (e.g., in a register or in a data structure in main memory) for subsequent processing using the cached data, as in 960.

Note that while in the example illustrated in FIG. 9, the application may configure each node, in turn, for message driven prefetching and then may distribute a portion of a large data set to each node, in turn, in other embodiments, these operations may be performed in a different order and/or some of them may be performed in parallel. For example, in other embodiments, the configuration registers of the NTPs of the computing nodes may be initialized after the data set is distributed among the computing nodes (rather than before), or the configuration registers of the NTPs of the computing nodes may be initialized during an initialization of each computing node that includes both the initialization of its configuration registers and the storing of a portion of the data set on the computing node. In still other embodiments, multiple computing nodes may be initialized or loaded with data from the large data set at approximately the same time (e.g., by parallel processes or threads).

Figure 10:
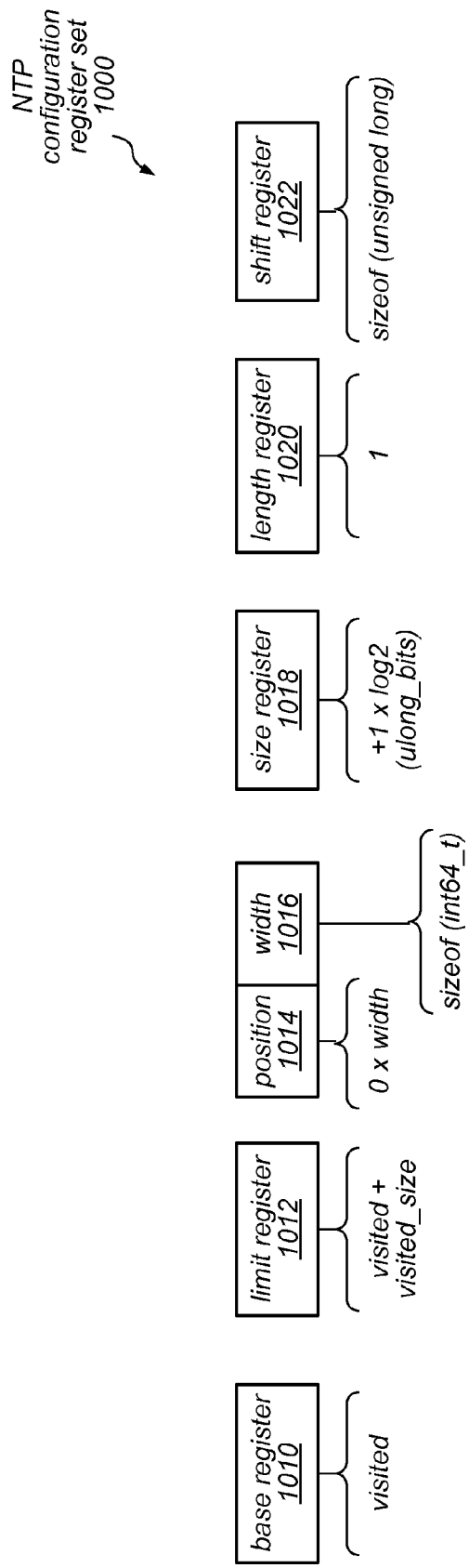
FIG. 10 illustrates an example configuration for providing message driven prefetching, according to some embodiments.

An example configuration of NTP configuration registers (shown as NTP configuration registers 1000) for the parallel BFS graph kernel described above is illustrated in FIG. 10. In this example, the data structure from which data is to be prefetched is the visited array. Therefore, the base register value is set to point to the start of the visited array and the limit register value is set to point to the end of the visited array (which may be calculated as the starting address of the visited array plus the array size). In other words, the values of base register 1010 and limit register 1012 are set to the starting and ending addresses of the visited array, respectively. In this example, each of the data items (e.g., each vertex ID) is 64 bits long. Therefore, the width portion (1016) of the position/width register is set to 64 bits. In this example, since the data reference (e.g., the target vertex ID field) is found at the beginning of the message payload, the value of the position portion (1014) of the position/width register is set to zero times the width (i.e., 0).

In this example, the visited array is a Boolean array. Therefore, a shift operation may need to be applied to the prefetch address calculation in order to be able to prefetch the appropriate bits. In this example, the value of the shift register 1022 is set to the size of the unsigned long variables in the system. As described above, the value of length register 1020 is set to the number of data items that are to be prefetched from the data structure (i.e., the visited array) in memory into the cache. Here, the value of the length register 1020 is set to 1, indicating that only one item (e.g., one item of the size indicated in size register 1018) will be prefetched for each incoming message. In this example, the value of the size register 1018 is set to a value equal to $+1 \times \log_2(\text{ulong\_bits})$, where ulong_bits is the size (in bits) of the unsigned long variables in the system.

As noted above, different network interfaces (e.g., different network interface cards) may include more, fewer, or different NTP configuration registers containing more, fewer, or different configuration parameter fields in a similar or different order than those illustrated in the examples herein, in different embodiments. In various embodiments, the configuration registers may be programmed (e.g., in software, firmware, or field-programmable logic) in order to map the information that is included in the messages received by the network interface to the configuration parameters needed to locate the value(s) to be prefetched (e.g., to compute an address and extent of the data to be prefetched). After the NTP configuration registers on a particular computing node have been initialized, as each message is received, the information needed to locate the value(s) to be prefetched may be extracted from the message by the network interface (based on the values in the configuration registers), and a prefetch address and length may be computed and sent to the LLC prefetcher to bring the referenced data (e.g., the appropriate visited array elements) into the cache. The network interface may then let the appropriate processor know that the referenced data has been prefetched. Subsequently, the processor may retrieve the message (e.g., from a message buffer), may extract out the target vertex ID, and may access the identified element in the visited array, which will already be in the cache.

As noted above, in some embodiments, a group of messages may be received and buffered up before processing of any of the messages begins. For example, in some embodiments, there may be many requests to process particular data structure elements (e.g., multiple requests of the same size) received by a network interface on one of the participating computing nodes in one long message, and the network interface may treat the requests as if they were received in separate messages. In such embodiments, the network interface card of the recipient computing node may receive the long message and start processing the first request, then the next one, then the next one, etc. In some embodiments, the message driven prefetching mechanism described herein may not reduce the latency (or processor stalls) for the first request significantly (or at all), but as the network interface continues to initiate the prefetching of the data needed by subsequent ones of the requests in the long message, the latency may be vastly improved for the subsequent requests. For example, in some embodiments, when a message is received that includes multiple requests, the network interface card may be configured to extract out information needed to compute the addresses (and extents) of the data items that it will need to process and may start prefetching them one at a time, in group, and/or in parallel so that the data is ready when it is needed.

Note that while the techniques described herein for implementing message driven prefetching may or may not improve the latency performance for any individual message in a parallel data-intensive application that employs a function shipping model, from a statistical standpoint, it is likely that these techniques will improve the latency performance for enough of the individual messages that a performance improvement is achieved for the overall computation in a wide variety of such parallel applications. Note that, because of the way the code and data structures of graph processing and graph search applications are configured and distributed, and the relationships between the messages received by each computing node and its local data structures, it is likely that most (if not all) of these types of applications will benefit from the use of these techniques.

Figure 11:
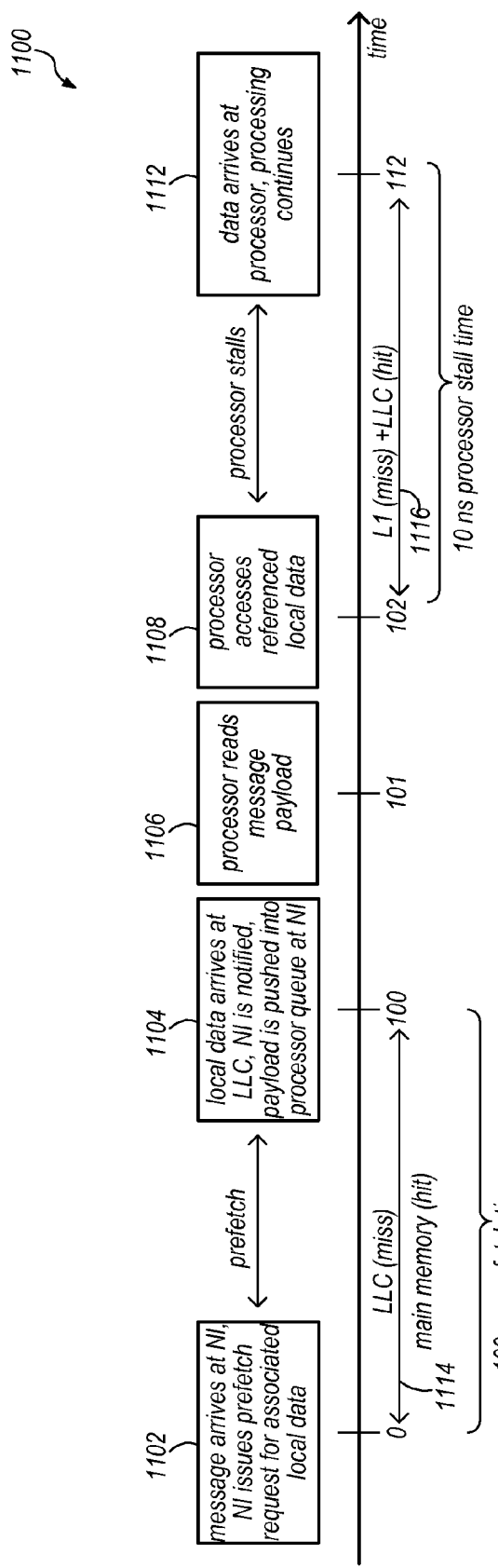
FIG. 11 is an execution timeline illustrating a prefetching operation and a processor stall in a computing node that employs message driven prefetching, according to some embodiments.

FIG. 11 is an execution timeline illustrating a prefetching operation and a processor stall in a computing node that employs message driven prefetching, according to some embodiments. In other words, the timeline illustrated in FIG. 11 represents the handling of an example message that is received by a network interface component that supports message driven prefetching and/or in which a message driven prefetching feature is enabled for the received message. The message itself may be similar to the message whose handling is reflected in the execution timeline illustrated in FIG. 5 (e.g., it may include the same data reference as the message whose handling is reflected in the execution timeline illustrated in FIG. 5). However, in some embodiments, the message payload of the message whose handling is reflected in the execution timeline illustrated in FIG. 11 may include a prefetch bit that is set (indicating that message driven prefetching should be applied to the handling of the message).

In the example timeline 1100 illustrated in FIG. 11, a message arrives at the network interface at some time designated as time 0 (for this message) and the network interface issues a prefetch request for associated local data that was referenced in the message (as in 1102). In this example, after a last level cache miss, the data referenced in the message is located in main memory and loaded into the last level cache using a prefetch operation, with the prefetching taking a total of 100 ns (shown as 1114). Note that the processor to which the message is directed may not be stalled during this prefetching time, since it has not yet attempted to locate the referenced data and is not waiting for the referenced data to be located. Instead the processor may be operating on other data during this period.

As illustrated in this example, when the local data arrives at LLC, the network interface is notified, and the message payload is pushed into a local data structure (e.g., a processor queue) at the network interface (such as one of the processor queues 320 in FIG. 3) for subsequent processing (as in 1104). Subsequently, the processor begins processing the message, which includes reading the message payload (as in 1106). In this example, the processor begins processing the message shortly after the message is placed in its queue (e.g., at time 101, or 1 ns later). At time 102 (or 2 ns after the message was placed in the processor queue at the network interface), the processor accesses the referenced local data (as in 1108). As illustrated at 1116, in this example, the referenced data is not found in the level 1 cache, but is found in the LLC. This results in a processor stall time of only 10 ns between the time the processor attempts to access the referenced data and the time the data arrives at processor (e.g., at time 112), after which processing continues (as in 1112).

Note that while the total time between the arrival of a message at the network interface and the time at which the data referenced in the message can be processed is the same in the timelines illustrated in FIGS. 5 and 11, by enabling message driven prefetching, the processor stall time may be greatly reduced. For example, as illustrated in FIG. 11, the amount of the stall time of the processor may be reduced because the message is available to the processor only after the network interface prefetches the associated local data. Thus, in some embodiments, the vast majority of the memory latency time (e.g., for messages other than the first message or the first few messages) may be hidden while the processor is doing something else, and overall throughput may be improved.

Unlike with previous software or hardware prefetching techniques, in some embodiments, the message driven prefetching techniques described herein may be used to improve memory latency for parallel applications that employ a function shipping model. For example, the arrival time and the contents of the messages exchanged by such applications are typically not known at compile time, rendering conventional software prefetching techniques unsuitable for use in this setting. In another example, since the network messages arriving at the network interface do not typically follow a predictable pattern in these types of applications, the memory accesses they cause cannot be learned by hardware predictors, rendering traditional hardware prefetching techniques unsuitable for use in this setting.

In addition, unlike software prefetching techniques (which require a significant effort at compile-time to predict locations in application code to insert fetch instructions), the message driven prefetching techniques described herein may not require an aggressive compiler or programmer effort beyond a simple setup of the NTP configuration registers at the beginning of the application. Furthermore, unlike with existing prediction-based approaches, the message driven prefetching techniques described herein do not involve prediction, and thus they may avoid cache pollution caused by mispredictions. In other words, unlike with existing prediction-based approaches, because the message driven prefetching techniques described herein only issue prefetch requests for data items that are required by the application to process the incoming network messages, there is never a scenario in which unneeded data is prefetched into the cache hierarchy, polluting the cache.

As described in detail herein, message driven prefetching may reduce the cache misses to critical data structures experienced by big-data applications by prefetching the data items referenced incoming messages at the network interface. These techniques do not impose any processor overhead and may free the CPU from memory related stalls, in many cases. In some embodiments, the message driven prefetching mechanisms may be implemented in hardware but controlled in software to provide flexibility and performance improvements for a wide variety of parallel applications (e.g., those in the class of applications that employ a function shipping type model and that operate on large data sets, including, but not limited to, data-mining applications, graph processing applications, and graph search applications).

In some embodiments, the NTP may support multiple prefetches based on a single message. In such embodiments, the NTP may include multiple sets of the registers described herein and each message may carry multiple offsets. In various embodiments, these prefetches may be to the same data structure or to different data structures.

In some embodiments, an NTP implementation may include multiple sets of configuration registers to support independent streams of messages without needing to duplicate the entire NTP and/or the LLC prefetcher. This may allow an application (or multiple applications) to send different types of messages to a destination computing node, where each type of message triggers prefetches to a different local data structure. For example, in some embodiments, the NTP may include multiple sets of the same types of registers (e.g., sets of registers similar to those illustrated in FIGS. 6 and 7 and described above) that are programmed to extract information from the messages to support interaction with different (but similarly constructed) local data structures. In some such embodiments, each message may carry a stream ID (e.g., one that indicates which of the sets of registers to use) in addition to the prefetch bit. Dependent on the stream ID, the NTP may extract information from a received message that, along with the configuration parameter values programmed in the identified set of registers, is usable to determine an address and extent for the data to be prefetched in response to the message.

In other embodiments, the NTP implementation may include multiple sets of configuration registers that are different from each other. For example, each set of registers may be associated with message fields that are different than those described above, and the configuration parameter values programmed in each of these sets of registers may support the location of data elements in different types of local data structures, as referenced in the messages. Here again, each message may include a message type indicator or some other indicator of the set of registers to use when processing the message for message driven prefetching. In various embodiments, by including multiple sets of similar or dissimilar configuration registers, and programming them for use with particular message formats and local data structures, the NTP may be configured to support a wide variety of parallel data-intensive applications that employ a function shipping model. In each such embodiment, the NTP may compute address and extent information for the data to be prefetched in response to various messages, and may provide this information to the LLC prefetcher as the prefetch address and prefetch length. Note that additional features may be supported in the NTP as different register sets and/or configuration parameter value fields are included in the NTP implementation, some of which may also require support in the application software or in firmware executing on the network interface cards.

As previously noted, the message driven prefetching mechanisms described herein may be well-suited for use with the class of applications that can be referred to generally as "data-intensive applications". While many of the examples described herein are directed toward graph processing applications and graph search applications, other types of applications in this class, such as large database applications or some high-performance computing (HPC) applications (such as MapReduce type applications) may also benefit from the implementation of these mechanisms. In one example, these message driven prefetching mechanisms may be applied in executing an application in which a very large matrix multiplication is executed over many computing nodes using a function shipping mode (e.g., one in which each computing node is given a portion of the matrix on which to operate to produce intermediate results). In another example, these message driven prefetching mechanisms may be applied in executing a data analytics application in which a database table over which the application operates is too large to fit in main memory on a single computing node. In this example, the application may employ function shipping in order to access (and process information in) all of the rows of a table (which are scattered over multiple computing nodes). Other big-data applications that operate on what are, essentially, large graphs (and which may benefit from the use of message driven prefetching mechanisms) include various social media applications in which users are "connected to" or otherwise associated with other users, and those that analyze communication data (e.g., cell phone records, internet message records, etc.). Another class of applications that may benefit from the use of message driven prefetching mechanisms is the class of applications that implement a betweenness-centrality computation, which attempt to assess the value of each node in a network of connected nodes (e.g., a graph) based on the number of interactions in which it participates.

Example System

Figure 12:
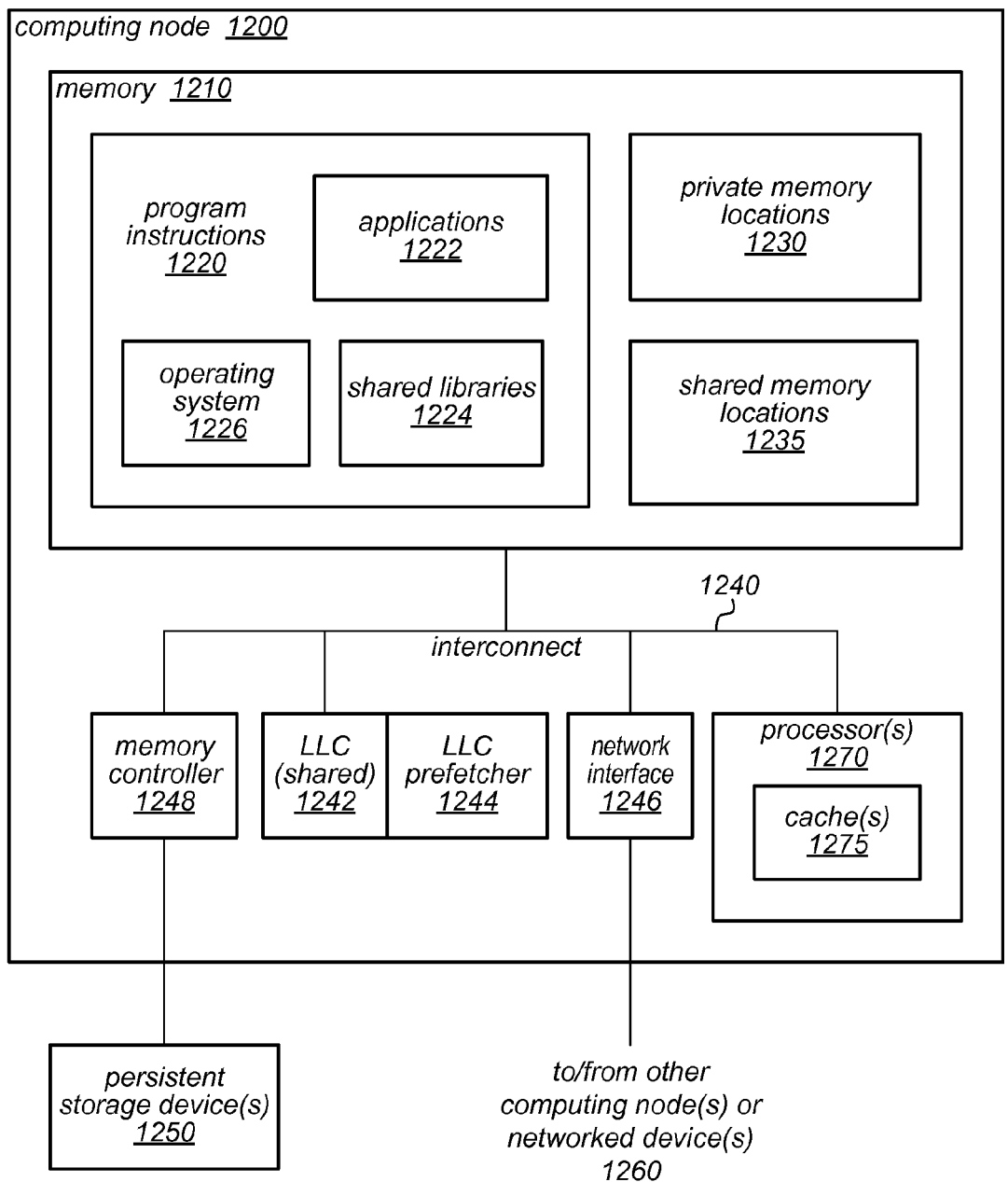
FIG. 12 illustrates a computing system configured to perform message driven prefetching at the network interface, according to various embodiments.

FIG. 12 illustrates a computing node that is configured to implement the methods described herein, according to various embodiments. The computing node 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Some of the functionality of the mechanisms for performing message driven prefetching at the network interface, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computing node 1200 may include one or more processors 1270; each may include multiple cores, any of which may be single or multi-threaded. For example, as illustrated in FIG. 2, multiple processor cores may be included in a single processor chip (e.g., a single processor 1270), and multiple processor chips may be included on a CPU board, two or more of which may be included in computing node 1200. Each of the processors 1270 may include a hierarchy of caches 1275, in various embodiments. For example, each processor 1270 (or processor chip) may include one or more local caches (e.g., one L1 cache per processor core and/or one or more caches that are shared by multiple processor cores on a single processor chip, such as an L2 cache and/or a last level cache). As illustrated in this example, computing node 1200 may include a memory controller 1248 (which may be similar to memory controller 210 illustrated in FIG. 2 and described above), a shared LLC 1242 (which may be similar to LLC 212 illustrated in FIG. 2 and described above), an LLC prefetcher 1244 (which may be similar to LLC prefetcher 214 illustrated in FIG. 2 and described above), and/or a network interface 1246. In various embodiments, network interface 1246 may be similar to one of the network interfaces described herein, and may be configured to support message driven prefetching. For example, in some embodiments, network interface 1246 may include an NTP component and a collection of configuration registers that (along with software support) implement message driven prefetching, as described herein. In various embodiments, network interface 1246 may exchange function shipping messages or other data with other computing node(s) or networked device(s) 1260.

As illustrated in FIG. 12, computing node 1200 may also include or have access to one or more persistent storage devices 1250 (e.g. optical storage, magnetic storage, hard drive, tape drive, solid state memory, etc., that is external to, but accessible by, computing node 1200), and one or more system memories 1210 (e.g., one or more of cache, SRAM, DRAM, RDRAM, EDO RAM, DDR 10 RAM, SDRAM, Rambus RAM, EEPROM, etc.). In some embodiments, all or a portion of system memory 1210 may be similar to memory 204 in FIG. 2, in that it may store a portion of a large data set for a data-intensive application on which processor(s) 1270 may operate locally. For example, memory 1210 on computing node 1200 may include local storage (e.g., within private memory locations 1230 or shared memory locations 1235) for data structures, elements of which may be the targets of various functions of a data-intensive application (e.g., as referenced in function shipping messages received by network interface 1246). In some embodiments, memory 1210 may include persistent storage (e.g., for storing firmware or configuration parameter values that are fixed for a given computing node or a given set of configuration registers). In other embodiments, configuration registers or configuration parameter stored in system memory 1200 may be programmable (e.g., at runtime). Various embodiments of computing node 1200 may include fewer or additional components not illustrated in FIG. 12 (e.g., video cards, audio cards, additional network interfaces, peripheral devices, a network interface such as an ATM interface, an Ethernet interface, a Frame Relay interface, etc.)

In this example, the one or more processors 1270, the memory controller 1248 (which may provide access to storage devices 1250), the last level cache 1242 and/or its associated prefetcher 1244, the network interface 1246, and the system memory 1210 may be coupled to the system interconnect 1240. One or more of the system memories 1210 may contain program instructions 1220. Program instructions 1220 may be executable to implement one or more applications 1222 (which may include all or a portion of a parallel data-intensive application that employs a function shipping model, as described herein), shared libraries 1224, or operating systems 1226. Program instructions 1220 may be encoded in platform native binary, any interpreted language such as Java™ byte-code, or in any other language such as C/C++, Java™, etc. or in any combination thereof. The program instructions 1220 may include functions, operations and/or other processes for performing message driven prefetching at the network interface, as described herein. Such support and functions may exist in one or more of the shared libraries 1224, operating systems 1226, or applications 1222, in various embodiments. The system memory 1210 may further comprise private memory locations 1230 and/or shared memory locations 1235 where data (including a portion of a data set for a parallel data-intensive application and/or configuration parameter values) may be stored. For example, private memory locations 1230 and/or shared memory locations 1235 may store data accessible to concurrently executing threads, processes, or transactions, in various embodiments. In addition, the system memory 1210 and/or any of the caches of processor(s) 1270 (including shared LLC 1242) may, at various times, store data that has been fetched (or prefetched) from one of system memories 1210 and/or from storage devices 1250 by an application executing on computing node 1200 or by LLC prefetcher 1244 (e.g., in response to receipt of a function shipping message and under the control of network interface 1246). Note that the system memory 1210 and/or any of the caches of processor(s) 1270 (including shared LLC 1242) may, at various times, store any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of parallel data-intensive applications and function shipping message formats, it should be noted that the techniques and mechanisms disclosed herein for performing message driven prefetching at the network interface may be applicable in other contexts in which a parallel data-intensive application employs a function shipping type model. It is intended that the following claims be interpreted to embrace all such variations and modifications.

What is claimed:
1. A system, comprising:
a plurality of computing nodes, each of which comprises:
one or more processor cores;
a cache memory shared by the one or more processor cores;
a cache prefetcher;
a local system memory, wherein the local system memory comprises one or more data structures configured to store messages, and wherein the local system memory stores a portion of a large data set; and a network interface component comprising a plurality of registers;
wherein the local system memories of the plurality of computing nodes collectively store program instructions that when executed on the one or more processor cores of the plurality of computing nodes implement an application that operates on the large data set;
wherein the network interface component of a given one of the plurality of computing nodes is configured to:
receive a message from another one of the plurality of computing nodes, wherein the message comprises a reference to data in the large data set that is stored in the local system memory of the given computing node;
determine the physical location of the referenced data on the given computing node;
communicate information indicating the physical location of the referenced data to the cache prefetcher on the given computing node; and
store the message in a data structure in the local system memory of the given computing node for subsequent processing by one of the one or more processor cores of the given computing node; and
wherein the cache prefetcher of the given computing node is configured to:
receive the information indicating the physical location of the referenced data from the network interface component; and
prefetch the referenced data from the local system memory of the given computing node into the cache memory of the given computing node; and
wherein the one of the one or more processor cores is configured to:
retrieve the message from the data structure in the local system memory of the given computing node; and
process the message, wherein to process the message, the one of the plurality of processor cores is configured to operate on the prefetched referenced data in the cache memory of the given computing node.
2. The system of claim 1,
wherein the message comprises an indication that a prefetching feature of the network interface component is to be enabled for the message; and
wherein the network interface component is configured to determine the physical location of the referenced data and communicate the information indicating the physical location of the referenced data to the cache prefetcher in response to the indication in the message that the prefetching feature is to be enabled.

3. The system of claim 1,
wherein each of the plurality of computing nodes comprises two or more processor cores in two or more processors; and
wherein each of the plurality of computing nodes further comprises:
one or more cache memories that are local to a respective processor; or
one or more cache memories that are local to a respective processor core.

4. The system of claim 1,
wherein the given computing node comprises two or more processor cores;
wherein each of two or more of the plurality of registers of the network interface component of the given computing node is configured to store information usable in processing messages by a respective one of the two or more processor cores;
wherein the message further comprises an identifier of the one of the processor cores; and
wherein to store the message in a data structure in the local system memory of the given computing node for subsequent processing by one of the one or more processor cores of the given computing node, the network interface component is configured to store the message in a data structure that is configured to store messages to be processed by the one of the one or more processor cores of the given computing node, dependent on the identifier in the message.

5. The system of claim 1,
wherein one of the plurality of registers of the network interface component of the given computing node is configured to store information specifying a position of the reference within the message; and
wherein to determine the physical location of the referenced data on the given computing node, the network interface component of the given computing node is configured to extract the reference from the message dependent, at least in part, on the information stored in the one of the plurality of registers.

6. The system of claim 1,
wherein one of the plurality of registers of the network interface component of the given computing node is configured to store information specifying a width of the reference within the message, a base address of a data structure in which the referenced data is stored on the given computing node, a number of data items to be prefetched, or a size of a data item to be prefetched; and
wherein to determine the physical location of the referenced data on the given computing node, the network interface component of the given computing node is configured to compute the physical location of the referenced data dependent, at least in part, on the information stored in the one of the plurality of registers.

7. The system of claim 1,
wherein the given computing node further comprises a translation lookaside buffer;
wherein to determine the physical location of the referenced data on the given computing node, the network interface component of the given computing node is configured to:
extract the reference from the message;
compute a virtual address of the referenced data based, at least in part, on the extracted reference;
provide the computed virtual address to the translation lookaside buffer for translation to a physical address; and
receive the physical address from the translation lookaside buffer.

8. The system of claim 1,
wherein the cache prefetcher of the given computing node is further configured to communicate to the network interface component an acknowledgement that the referenced data has been prefetched from the local system memory of the given computing node into the cache memory of the given computing node; and
wherein the network interface component of the given computing node is configured to store the message in the data structure in the local system memory of the network interface component of the given computing node in response to receiving the acknowledgment from the cache prefetcher.

9. The system of claim 1,
wherein the network interface component of the given one of the plurality of computing nodes is further configured to:
receive a second message from another one of the plurality of computing nodes, wherein the second message comprises a reference to data in the large data set that is stored in the local system memory of the given computing node;
wherein the second message comprises an indication that a prefetching feature of the network interface component is to be disabled for the second message; and
wherein the network interface component is configured to store the second message in a data structure in the local system memory of the given computing node for subsequent processing by one of the one or more processor cores of the given computing node, without first determining the physical location of the referenced data or communicating information indicating the physical location of the referenced data to the cache prefetcher, in response to the indication in the second message that the prefetching feature is to be disabled for the second message.

10. The system of claim 1,
wherein one of the plurality of registers of the network interface component of the given computing node is configured to store information reflecting one or more error conditions;
wherein the network interface component of the given one of the plurality of computing nodes is further configured to:
receive a second message from another one of the plurality of computing nodes, wherein the second message comprises a reference to data in the large data set;
compute an address of the data referenced in the second message;
determine that the computed address of the data referenced in the second message exceeds the boundaries of a data structure that holds the portion of the large data set that is stored in the local system memory of the given computing node; and
in response to determining that the computed address of the data referenced in the second message exceeds the boundaries of the data structure, store a value in the one of the plurality of registers indicating an error condition.

11. A method, comprising:
beginning execution of a distributed application over a plurality of computing nodes, each comprising one or more processors and memory;
receiving, by a given one of the plurality of computing nodes from another one of the plurality of computing nodes, a message comprising a reference to data that is stored in a local system memory of the given computing node and that is to be operated on as part of executing the application;
in response to said receiving, initiating a prefetch of the referenced data from the local system memory of the given computing node into a cache memory on the given computing node;
subsequent to said initiating, storing the message in a data structure in the local system memory of the given computing node that stores messages for subsequent processing by a processor of the given computing node; and
processing the message, wherein said processing comprises the processor of the given computing node operating on the referenced data that was prefetched from the local system memory of the given computing node into the cache memory on the given computing node.

12. The method of claim 11,
wherein said initiating comprises:
determining the physical location of the referenced data on the given computing node; and
communicating information indicating the physical location of the referenced data to a cache prefetcher on the given computing node; and
wherein the method further comprises receiving acknowledgement that the referenced data has been prefetched from the local system memory of the given computing node into the cache memory on the given computing node; and
wherein said storing is performed in response to said receiving acknowledgement.

13. The method of claim 11, wherein said initiating comprises computing a physical address of the referenced data dependent, at least in part, on information stored in one or more registers on the given computing node that store information specifying a position of the reference within the message, a width of the reference within the message, a base address of a data structure in which the referenced data is stored on the given computing node, a number of data items to be prefetched, or a size of a data item to be prefetched.

14. The method of claim 11, wherein said receiving, said initiating, and said storing are performed by a network interface component of the given computing node.

15. The method of claim 11,
wherein the processor is one of two or more processors on the given computing node;
wherein the given computing node comprises two or more data structures in the local system memory, each of which stores messages to be processed by a respective one of the two or more processors;
wherein the message further comprises an identifier of the processor; and
wherein said storing the message in a data structure in the local system memory for subsequent processing comprises storing the message in one of the two or more data structures in the local system memory that is configured to store messages to be processed by the processor, dependent on the identifier in the message.

16. A non-transitory, computer-readable storage medium storing program instructions that when executed on a plurality of computers cause the plurality of computers to perform:
storing a respective portion of a data set in a local system memory on each of the plurality of computers;
beginning execution of a distributed application that operates on the data set;
receiving, by a given one of the plurality of computers from another one of the plurality of computers, a message comprising a reference to data in the data set that is stored in the local system memory of the given computer;
in response to said receiving, initiating a prefetch of the referenced data from the local system memory of the given computer into a cache memory on the given computer;
subsequent to said initiating, storing the message in a queue in the local system memory on the given computer that stores messages for subsequent processing by a processor of the given computer; and
subsequent to said storing, processing the message, wherein said processing comprises the processor of the given computer:
retrieving the message from the queue in the local system memory; and
operating on the referenced data that was prefetched from the local system memory of the given computer into the cache memory on the given computer.

17. The non-transitory, computer-readable storage medium of claim 16,
wherein when executed on the plurality of computers, the program instructions further cause the plurality of computers to perform, prior to said receiving:
initializing contents of one or more configuration registers of the given computer, wherein the one or more configuration registers store information specifying a position of the reference within the message, a width of the reference within the message, a base address of a data structure in which the referenced data is stored on the given computer, a number of data items to be prefetched, or a size of a data item to be prefetched; and
wherein said initiating comprises computing a physical address of the referenced data dependent, at least in part, on information stored in one or more of the one or more configuration registers of the given computer.

18. The non-transitory, computer-readable storage medium of claim 16, wherein said receiving, said initiating, and said storing are performed by a network interface component of the given computer in response to execution of the program instructions.

19. The non-transitory, computer-readable storage medium of claim 16, wherein said initiating comprises:
determining the physical location of the referenced data on the given computer; and
communicating information indicating the physical location of the referenced data to a cache prefetcher on the given computer.

20. The non-transitory, computer-readable storage medium of claim 16,
wherein the processor is one of two or more processors on the given computer;
wherein each of the two or more processors comprises a local cache memory; and
wherein said initiating a prefetch of the referenced data from the local system memory of the given computer into a cache memory on the given computer comprises prefetching the referenced data from the local system memory of the given computer into a cache memory that is shared by the two or more processors on the given computer.

* * * * *

UNITED STATES PATENT AND TRADEMARK OFFICE
CERTIFICATE OF CORRECTION

PATENT NO. : 9,535,842 B2  
APPLICATION NO. : 14/472105  
DATED : January 3, 2017  
INVENTOR(S) : Schwetman, Jr. et al.

Page 1 of 1

It is certified that error appears in the above-identified patent and that said Letters Patent is hereby corrected as shown below:

On the Title Page

On page 2, Column 2, under Other Publications, Line 12, delete "Cahce" and insert -- Cache --, therefor.

In the Specification

In Column 8, Line 31, after "(collectively)" insert -- on all --.

In Column 16, Line 2, after "checking" insert -- . --.

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*